US011902092B2

(12) United States Patent
Zheng et al.

(10) Patent No.: US 11,902,092 B2
(45) Date of Patent: Feb. 13, 2024

(54) SYSTEMS AND METHODS FOR LATENCY-AWARE EDGE COMPUTING

(71) Applicant: Samsung Electronics Co., Ltd., Suwon-si (KR)

(72) Inventors: Qinling Zheng, San Jose, CA (US); Ehsan Najafabadi, San Jose, CA (US); Yasser Zaghloul, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 613 days.

(21) Appl. No.: 16/790,582

(22) Filed: Feb. 13, 2020

(65) Prior Publication Data

US 2020/0267053 A1 Aug. 20, 2020

Related U.S. Application Data

(60) Provisional application No. 62/806,504, filed on Feb. 15, 2019.

(51) Int. Cl.
*H04L 67/1008* (2022.01)
*H04L 41/0823* (2022.01)
(Continued)

(52) U.S. Cl.
CPC ...... *H04L 41/0823* (2013.01); *G06F 9/45558* (2013.01); *G06N 3/049* (2013.01);
(Continued)

(58) Field of Classification Search
CPC ..... H04L 41/0823; H04L 41/16; H04L 43/16; H04L 47/31; H04L 67/1008; G06F 9/45558; G06F 2009/45591; G06N 3/049
See application file for complete search history.

(56) References Cited

U.S. PATENT DOCUMENTS 8,914,406 B1 * 12/2014 Haugsnes ........... G06F 9/45558
710/316
10,466,717 B1 * 11/2019 Su ..................... G06N 3/045
(Continued)

FOREIGN PATENT DOCUMENTS

CN 1823499 A 8/2006
CN 107482766 A 12/2017
(Continued)

OTHER PUBLICATIONS

Mach, Pavel et al., "Mobile Edge Computing: A Survey on Architecture and Computation Offloading," IEEE Communications Surveys & Tutorials, vol. 19, No. 3, 2017, pp. 1628-1656.
(Continued)

*Primary Examiner* — Dhairya A Patel
(74) *Attorney, Agent, or Firm* — Lewis Roca Rothgerber Christie LLP

(57) ABSTRACT

Provided are systems, methods, and apparatuses for latency-aware edge computing to optimize network traffic. A method can include: determining network parameters associated with a network architecture, the network architecture comprising a data center and an edge data center; determining, using the network parameters, a first programmatically expected latency associated with the data center and a second programmatically expected latency associated with the edge data center; and determining, based at least in part on a difference between the first programmatically expected latency or the second programmatically expected latency, a distribution of a workload to be routed between the data center and the edge data center.

19 Claims, 27 Drawing Sheets

(51) Int. Cl.
  *G06N 3/049*  (2023.01)
  *H04L 43/16*  (2022.01)
  *H04L 41/16*  (2022.01)
  *G06F 9/455*  (2018.01)
  *H04L 47/31*  (2022.01)

(52) U.S. Cl.
  CPC .............. *H04L 41/16* (2013.01); *H04L 43/16* (2013.01); *H04L 47/31* (2013.01); *H04L 67/1008* (2013.01); *G06F 2009/45591* (2013.01)

(56) References Cited

U.S. PATENT DOCUMENTS

| | | | |
|---|---|---|---|
| 10,791,168 B1* | 9/2020 | Dilley | H04L 67/288 |
| 2007/0174426 A1 | 7/2007 | Swildens et al. | |
| 2008/0114858 A1* | 5/2008 | Singh | H04L 67/1001 |
| | | | 709/217 |
| 2010/0251002 A1* | 9/2010 | Sivasubramanian | G06F 11/0793 |
| | | | 714/2 |
| 2011/0211449 A1 | 9/2011 | Attar et al. | |
| 2012/0163388 A1* | 6/2012 | Goel | H04L 12/4641 |
| | | | 370/395.53 |
| 2012/0265881 A1* | 10/2012 | Chen | H04L 12/12 |
| | | | 709/226 |
| 2013/0297770 A1 | 11/2013 | Zhang | |
| 2013/0325950 A1* | 12/2013 | Laden | H04L 67/1095 |
| | | | 709/204 |
| 2014/0122698 A1 | 5/2014 | Batrouni et al. | |
| 2015/0192978 A1* | 7/2015 | Ghose | H04L 9/40 |
| | | | 713/323 |
| 2015/0271081 A1 | 9/2015 | Arumilli et al. | |
| 2015/0319076 A1 | 11/2015 | Vasseur et al. | |
| 2015/0332145 A1 | 11/2015 | Vasseur et al. | |
| 2015/0341273 A1 | 11/2015 | Naouri et al. | |
| 2016/0080259 A1* | 3/2016 | Biancaniello | H04L 67/10 |
| | | | 709/203 |
| 2017/0026461 A1 | 1/2017 | Boutros et al. | |
| 2017/0054641 A1 | 2/2017 | Anerousis et al. | |
| 2017/0063674 A1 | 3/2017 | Maskalik et al. | |
| 2017/0230295 A1 | 8/2017 | Polacek | |
| 2018/0219955 A1* | 8/2018 | Chen | H04L 41/0896 |
| 2018/0270302 A1 | 9/2018 | Yang et al. | |
| 2020/0026564 A1* | 1/2020 | Bahramshahry | G06Q 10/06316 |
| 2020/0228630 A1* | 7/2020 | Guim Bernat | H04L 67/61 |
| 2020/0267053 A1* | 8/2020 | Zheng | H04L 67/1008 |
| 2020/0272896 A1* | 8/2020 | Wei | G06N 3/08 |
| 2020/0319696 A1* | 10/2020 | Kumar | G06N 3/044 |
| 2020/0401452 A1* | 12/2020 | Piercey | G06F 9/5016 |
| 2021/0014114 A1* | 1/2021 | Doshi | H04L 41/5019 |
| 2021/0049029 A1* | 2/2021 | Kumble | G06F 9/45558 |
| 2022/0283964 A1* | 9/2022 | Burstein | G06F 12/1063 |

FOREIGN PATENT DOCUMENTS

| | | |
|---|---|---|
| CN | 107819695 A | 3/2018 |
| CN | 109313624 A | 2/2019 |

OTHER PUBLICATIONS

Guo, Zhihao et al: "Mobile ad hoc network proactive routing with delay prediction using neural network," Wireles Networks, vol. 16, 2010, pp. 1601-1620.

EPO Extended European Search Report dated Sep. 13, 2022, issued in corresponding European Patent Application No. 20756202.6 (11 pages).

Chinese Office Action dated Oct. 28, 2023, issued in Chinese Patent Application No. 202080005440.X, 18 pages.

* cited by examiner

SYSTEMS AND METHODS FOR LATENCY-AWARE EDGE COMPUTING

CROSS-REFERENCE TO RELATED APPLICATION

This application claims priority to and the benefit of U.S. Provisional Application No. 62/806,504, which is entitled "SIMULATION STUDY ON LATENCY-AWARE NETWORK IN EDGE COMPUTING" and was filed on Feb. 15, 2019, the entire contents of which are incorporated herein by reference in their entirety.

FIELD

The present disclosure generally relates to edge computing, and more specifically, to systems and methods for latency-aware edge computing.

BACKGROUND

In recent years, Internet of Things (IoT) and fifth generation (5G) devices and techniques have gained prominence in various consumer, commercial, industrial, and infrastructural applications. As mobile data traffic grows and wireless devices become more abundant and diverse, service providers that operate networks and/or IoT and 5G devices that use such protocols may face significant overhead. Accordingly, IoT and 5G communications represent some computing platforms that are increasingly migrating from cloud computing to edge computing platforms.

The above information disclosed in this Background section is only for enhancement of understanding of the background of the disclosure and therefore it may contain information that does not constitute prior art.

SUMMARY

In various embodiments, described herein include systems, methods, and apparatuses for routing workloads to different portions of a network architecture including edge computing data centers and at least one core data center based on models of network parameters latencies, power usage, workload processing efficiency, combinations thereof, and/or the like) associated with different portions of the network architecture.

In some embodiments, a device for network optimization is described. The device can include at least one memory device that can store computer-executable instructions and at least one processor configured to access the memory device. The processor can be configured to execute the computer-executable instructions to: determine network parameters associated with a network architecture, the network architecture including a data center and an edge data center; determine, using the network parameters, a first programmatically expected latency associated with the data center and a second programmatically expected latency associated with the edge data center; and determine, based at least in part on a difference between the first programmatically expected latency or the second programmatically expected latency, a distribution of a workload to be routed between the data center and the edge data center.

In some examples, the network parameters can include at least one of a usage percentage, a core data center selection probability, a delay sensitivity value, an data upload amount, a data download amount, a processor usage requirement, a virtual machine (VM) utilization, combinations thereof, and/or the like. In some embodiments, the determination can be performed using a machine learning technique, the machine learning model including at least one of a supervised machine learning technique or an unsupervised machine learning technique, the machine learning technique further including at least one of a long short term memory (LSTM) neural network, a recurrent neural network, a time delay neural network, or a feed forward neural network. In other aspects, the distribution can be determined based at least in part on the difference exceeding a predetermined threshold. In some examples, at least one of (1) a transmission rate associated with data traffic to and from the data center, (2) a transmission rate associated with data traffic to and from the edge data center, (3) a transmission rate associated with data traffic to and from a device associated with the edge data center, or (4) a transmission rate associated with data traffic to and from a device associated with the data center can be throttled based on the difference.

In other aspects, the processor can be further configured to label at least a first portion of the workload with a first tag, the first tag indicating that the first portion is to be routed to the data center, and the processor is configured to label at least a second portion of the workload with a second tag, the second tag indicating that the second portion is to be routed the edge data center. In some examples, the processor can be further configured to (1) receive a first completed workload associated with the first portion from the data center, and (2) receive a second completed workload associated with the second portion from the edge data center, and (3) classify, filter, or aggregate the first completed workload or the second completed workload using the first tag or second tag. In an embodiment, the processor can be configured to cause to transmit at least the first completed workload or the second completed workload to a second device on the network architecture.

In various aspects, a method for network optimization is described. The method can include: determining network parameters associated with a network architecture, the network architecture including a data center and an edge data center; determining, using the network parameters, a first programmatically expected latency associated with the data center and a second programmatically expected latency associated with the edge data center; and determining, based at least in part on a difference between the first programmatically expected latency or the second programmatically expected latency, a distribution of a workload to be routed between the data center and the edge data center.

In other embodiments, the network parameters can include, but not be limited to, at least one of a usage percentage, a core data center selection probability, a delay sensitivity value, an data upload amount, a data download amount, a processor usage requirement, a VM utilization, combinations thereof, and/or the like. In some aspects, the determination can be performed using a machine learning technique, the machine learning technique including at least one of a supervised machine learning technique or an unsupervised machine learning technique, the machine learning technique further including at least one of an LSTM neural network, a recurrent neural network, a time delay neural network, or a feed forward neural network. In an example, the distribution can be determined based at least in part on the difference exceeding a predetermined threshold. In other aspects, the method can further include throttling, based on the difference, at least one of (1) a transmission rate associated with data traffic to and from the data center, (2) a transmission rate associated with data traffic to and from the edge data center, (3) a transmission rate associated with data traffic to and from a device associated with the edge data center, or (4) a transmission rate associated with data traffic to and from a device associated with the data center.

The method can further include labeling at least a first portion of the workload with a first tag, the first tag indicating that the first portion is to be routed to the data center, and labeling at least a second portion of the workload with a second tag, the second tag indicating that the second portion is to be routed the edge data center. The method can further include (1) receiving a first completed workload associated with the first portion from the data center, and (2) receiving a second completed workload associated with the second portion from the edge data center, and (3) classifying, filtering, or aggregating the first completed workload or the second completed workload using the first tag or second tag. In other embodiments, the method can further include transmitting at least the first completed workload or the second completed workload to a second, device on the network architecture.

In various embodiments, a non-transitory computer-readable medium storing computer-executable instructions is described which, when executed by a processor, cause the processor to perform certain operations including: determining network parameters associated with a network architecture, the network architecture including a data center and an edge data center; determining, using the network parameters, a first programmatically expected latency associated with the data center and a second programmatically expected latency associated with the edge data center; and determining, based at least in part on a difference between the first programmatically expected latency or the second programmatically expected latency, a distribution of a workload to be routed between the data center and the edge data center.

In some examples, the network parameters can include, but not be limited to, at least one of a usage percentage, a core data center selection probability, a delay sensitivity value, an data upload amount, a data download amount, a processor usage requirement, a VM utilization, combinations thereof, and/or the like. In other aspects, the determination is performed using a machine learning technique, the machine learning technique including at least one of a supervised machine learning technique or an unsupervised machine learning technique. Further, the machine learning technique can further include at least one of an LSTM neural network, a recurrent neural network, a time delay neural network, or a feed forward neural network. In some respects, at least one of (1) a transmission rate associated with data traffic to and from the data center, (2) a transmission rate associated with data traffic to and from the edge data center, (3) a transmission rate associated with data traffic to and from a device associated with the edge data center, or (4) transmission rate associated with data traffic to and from a device associated with the data center can be throttled based on the difference.

Accordingly, particular embodiments of the subject matter described herein can be implemented so as to realize one or more of the following advantages. Reduce network latencies and improve network stability and operational data transfer rates and, in turn, improve the user experience. Reduce costs associated with routing network traffic, network maintenance, network upgrades, and/or the like. Further, in some aspects, the disclosed systems can serve to reduce the power consumption and/or bandwidth of devices on a network, and may serve to increase the speed and/or efficiency of communications between devices.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
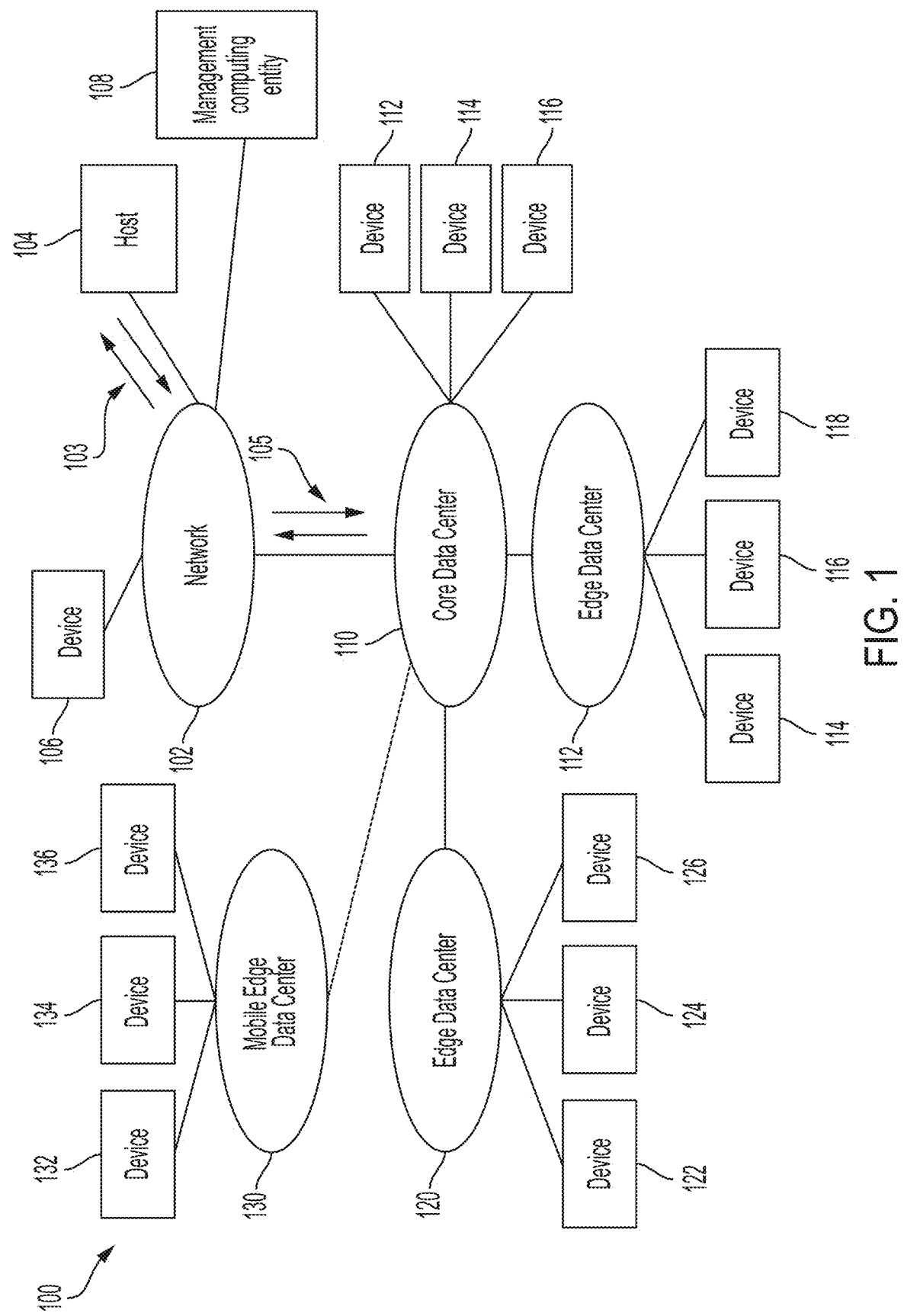
FIG. 1 depicts a diagram of a representative network architecture in which aspects of the disclosed embodiments can operate in connection with a first topology including a management computing entity communicatively coupled to a network, in accordance with example embodiments of the disclosure.

While the present techniques are susceptible to various modifications and alternative forms, specific embodiments thereof are shown by way of example in the drawings and will herein be described. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF VARIOUS EMBODIMENTS

The details of one or more embodiments of the subject matter described herein are set forth in the accompanying drawings and the description below. Other features, aspects, and advantages of the subject matter will become apparent from the description, the drawings, and the claims.

As used herein edge computing can refer to distributed computing systems which bring computation and data storage physically closer to the location where such resource may be needed, for example, to improve response times and save bandwidth. Edge computing can serve to move certain aspects of cloud computing, network control, and storage to network edge platforms edge data centers and/or devices) that may be physically closer to resource-limited end devices, for example, to support computation-intensive and latency-critical applications. Accordingly, edge computing may lead to a reduction in latency and an increase in bandwidth on network architectures that incorporate both edge and core data centers. In some aspects, to provide low-latency services, an edge computing paradigm may optimize an edge computing platform design, aspects of which are described herein.

In some examples, edge computing can further include various technological computational techniques including, but not limited to, mobile cloud computing (MCC), cloudless, fog computing, mobile edge computing (MEC), combinations thereof, and/or the like. For example, a cloudlet can refer to a low-latency network architecture that can support certain applications such as artificial reality (AR) and image processing tasks. Cloudlets can further refer to virtual platforms within networks, for example, between a core data center and user devices. Edge cloud composites or edge cloud computing (ECC), as well as MEC, can provide services at the edge of a core network and can support multiple users. Fog computing can refer to extended cloud computing at the edge of networks. In some aspects, fog computing can include cooperation between edge devices in networks and may be used in enterprise applications. In various embodiments, it is to be understood that various aspects of the disclosed embodiments can be used in connection with one or more edge computing techniques described above, which may collectively referred to as edge data center herein in the interest of brevity.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state component (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONGS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a co er program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

In certain examples, the disclosed systems can be implemented in connection with an MEC for purposes and ease of illustration of certain embodiments. It is to be understood that the disclosed systems can be used in connection with different network architectures than those explicitly described herein. In some respects, MEC may be used in the next evolution of cellular networks, for example, in fifth-generation (5G) networks. For instance, some governing bodies such as the European telecommunications standards institute (ETSI) may seek to standardize MEC to fulfill certain requirements of consumers and enterprises. As noted, MEC can serve to distribute cloud capabilities to the edge of networks where the cloud capabilities can be relatively closer to local mobile users. MEC can be implemented in connection with 5G cellular networks to enable a low-latency network architecture. To provide such low-latency service in MEC systems, the disclosed systems can to minimize the response time through the selection of client task offloading, offloaded task prioritizing, and offloaded task placing, as described further herein. Moreover, the disclosed systems can be used with predetermined configurations of an edge computing platform to meet latency requirements through edge-server architecture design and edge-computing service optimization.

As described further below, embodiments of the disclosure describe models (e.g., mathematical and machine-learning based techniques) that may include edge-computing architecture factors in simulating latencies on the network. Furthermore, the disclosed systems can model the storage performance factors in using models for offloading targets. Accordingly, in some examples, the disclosed systems can model a latency-aware network in MEC architecture. The disclosed systems can use such models to determine various parameters associated with the network including, but not limited to, the storage performance of devices on the network, the number of end-users, task size, memory, processor utilization effects, and/or the like. Further, the models can be used in connection with a machine-learning technique to route network data between various components of a network, such as a core data center and edge data centers, as described further below.

Turning now to the figures, FIG. 1 depicts a diagram of a representative network architecture in which aspects of the disclosed embodiments can operate in connection with a first topology, in accordance with example embodiments of the disclosure. In particular, diagram 100 shows a network 102, a first data transmission 103, a host 104, a second data transmission 105, a device 106, a management computing entity 108, a core data center 110, devices 112, 114, and 116, edge data center 112, devices 114, 116, and 118, edge data center 120, devices 122, 124, and 126, mobile edge data center 130, and devices 132, 134, and 136, further described below.

In some embodiments, diagram 100 shows that a host 104 can initiate a workload request via the first data transmission 103 to the network 102, The management computing entity 108 can monitor network parameters (e.g., data transmission rates, network portion utilizations, combinations thereof, and/or the like, further shown and described in connection with FIG. 7, below) associated with the network architecture (e.g., including, but not limited to, network parameters associated with the core data center 110 and various edge data centers such as edge data center 120 and edge data center 112). Based on the results of the monitoring, the management computing entity 108 can determine to route at least a portion of the workload to a core data center 110. In some examples, management computing entity 108 can further route a different portion of the workload to edge data center 112 or edge data center 120, in order make the determination of where to route the workload, the management computing entity 108 can run a model of the network architecture and/or portions of the network (e.g., edge data center, core data center, various devices, etc.) to determine latencies associated with different portions of the network architecture, to be further shown and described in connection with FIGS. 7-9, below. Optionally, the management computing entity 108 can use the latencies as inputs to a machine learning component (to be further shown and described in connection with FIGS. 4 and 5, below), to determine the optimal routing between core data center and edge data center computation of the workload.

Now turning to the various components shown in diagram 100, a more detailed description of the various components will be provided below. In some embodiments, network 102 can include, but not be limited to, the Internet, or a public network such as a wide area network (WLAN). In some examples, host 104 can include a network host, for example, a computer or other device connected to a computer network. The host may operate as a server offering information resources, services, and applications to users or other hosts on the network 102. In some example, the host may be assigned at least one network address. In other examples, computers participating in the a network such as the Internet can be referred to as Internet hosts. Such Internet hosts can include one or more IP addresses assigned to their respective network interfaces.

In some examples, device 106 can include a device that is directly connected to network 102, e.g., via a wired or wireless link. In some aspects, device 106 can initiate a workload (e.g., a video streaming request). The workload can then be processed by relevant portions of the network architecture in accordance with the disclosed embodiments herein. Examples of devices that can serve as device 106 are further shown and described in connection with FIG. 12, below.

In various embodiments, management computing entity 108 can perform routing of traffic and/or workload to a core data center 110 and/or one or more edge data centers 120. Further, management computing entity 108 can run a model to determine latencies associated with different portions of the network based on monitored network traffic data. An example model is further shown and described in connection with FIGS. 7-9, below. In some embodiments, management computing entity 108 can optionally run a machine learning model to determine how to route workload data. Examples of the machine learning model are shown and described in connection with FIGS. 4 and 5, below.

In some embodiments, the core data center 110 can include a dedicated entity that can house computer systems and associated components, such as telecommunications and storage systems and/or components. Further, the core data center 110 can include various servers that have computational, network, and storage resources for use in curing workloads, storing associated data, communicating data with the network 102, edge data centers (e.g., edge data center 120, mobile edge data center 130), and/or other portions (not shown) of the network architecture. In some embodiments, the core data center 110 can be connected to various devices (e.g., devices 112, 114, and 116). For example, the connection can be a wired connection (e.g., Ethernet-based) or a wireless connection (e.g., 5G, and/or cellular based). In another embodiment, the core data center 110 can receive workload requests from various devices (e.g., devices 112, 114, and 116) directly connected to the core data center 110, and can execute at least a portion of a given workload request (to be discussed further below). In some examples, the core data center 110 can transmit a result of a given workload to various devices that are either directly or indirectly connected to the core data center.

In some embodiments, the edge data center 112 can refer to a dedicated entity that can house computer systems and associated components, such as telecommunications and storage systems, and which can have many of the same or similar capabilities as core data centers; however, the edge data center 112 may generally have a smaller physical footprint comparison to the core data center. Further, the edge data center 112, as noted, may be positioned physically closer to end users, and can thereby provide decreased latencies for certain workloads and applications. In some embodiments, the edge data center 112 can be connected to a core data center or other edge data centers (e.g., mobile edge data center 130 or edge data center 112). Moreover, the edge data center 112 can receive workload requests from various devices (e.g., devices 122, 124, and 126) directly connected to the edge data center 112, and can execute at least a portion of a given workload request (to be discussed further herein). In another embodiment, the edge data center 112 can transmit a portion of a workload to other edge data centers (e.g., edge data center 120) or core data center (e.g., core data center 110). Further, the edge data center 112 can transmit a result of a given workload to various devices that are either directly or indirectly connected to the edge data center.

Figure 2:
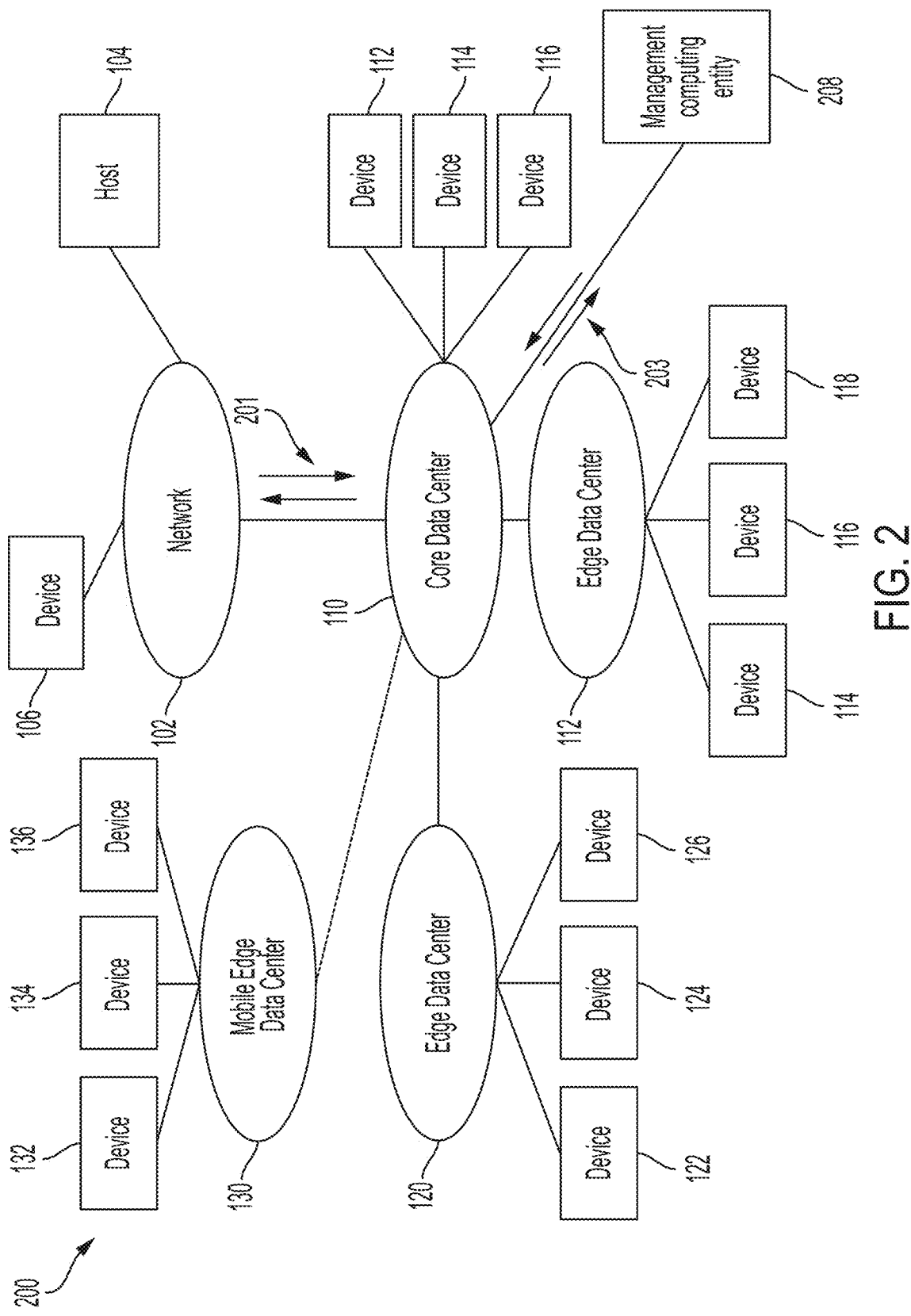
FIG. 2 depicts another diagram of the representative network architecture of FIG. 1 in which aspects of the disclosed embodiments can operate in connection with a second topology including the management computing entity communicatively coupled to a core data center, in accordance with example embodiments of the disclosure.

FIG. 2 depicts another diagram of the representative network architecture of FIG. 1 in which aspects of the disclosed embodiments can operate in connection with a second topology, in accordance with example embodiments of the disclosure. In particular, diagram 200 depicts many of the same elements as FIG. 1, described above. However, diagram 200 shows the management computing entity 208 which can be connected to the care data center 110 in this second topology instead of the network 102 as in FIG. 1. This is meant to illustrate the possibility that the management computing entity can reside at different locations on the network architecture (e.g., the core data center versus the network).

In some embodiments, diagram 200 further shows an example in which the network 102 can initiate a workload request via the first data transmission 201 to the core data center 110. For example, a device (e.g., device 106) or a host (e.g., host 104) connected to the network 102 can generate the workload, which can be processed by the network 102 can initiate the workload request via the first data transmission 203. The management computing entity 208 can again monitor network parameters (e.g., data transmission rates, network portion utilizations, combinations thereof, and/or the like, further shown and described in connection with FIG. 7, below) associated with the network architecture (e.g., the network parameters including, but not limited to, network parameters associated with the core data center 110 and various edge data centers such as edge data center 120 and edge data center 112).

Based on results of the monitoring, the management computing entity 208 can determine to maintain at least a portion of the workload to a core data center 110. In some examples, management computing entity 208 can further route a different portion of the workload to edge data center 112, edge data center 120, or even mobile edge data center 130 (e.g., an edge data center that can change locations, for example, via a wireless connection). As previously noted, to make the determination of where to route the workload, the management computing entity 208 can run a model of the network architecture and portions of the network to determine various latencies associated with different portions of the network architecture, to be further shown and described in connection with FIGS. 7-9, below. Optionally, the management computing entity 208 can use the latencies as inputs to a machine learning component (to be further shown and described in connection with FIGS. 4 and 5, below), to determine an optimal route between core data center and edge data center for computations of the workload.

Figure 3:
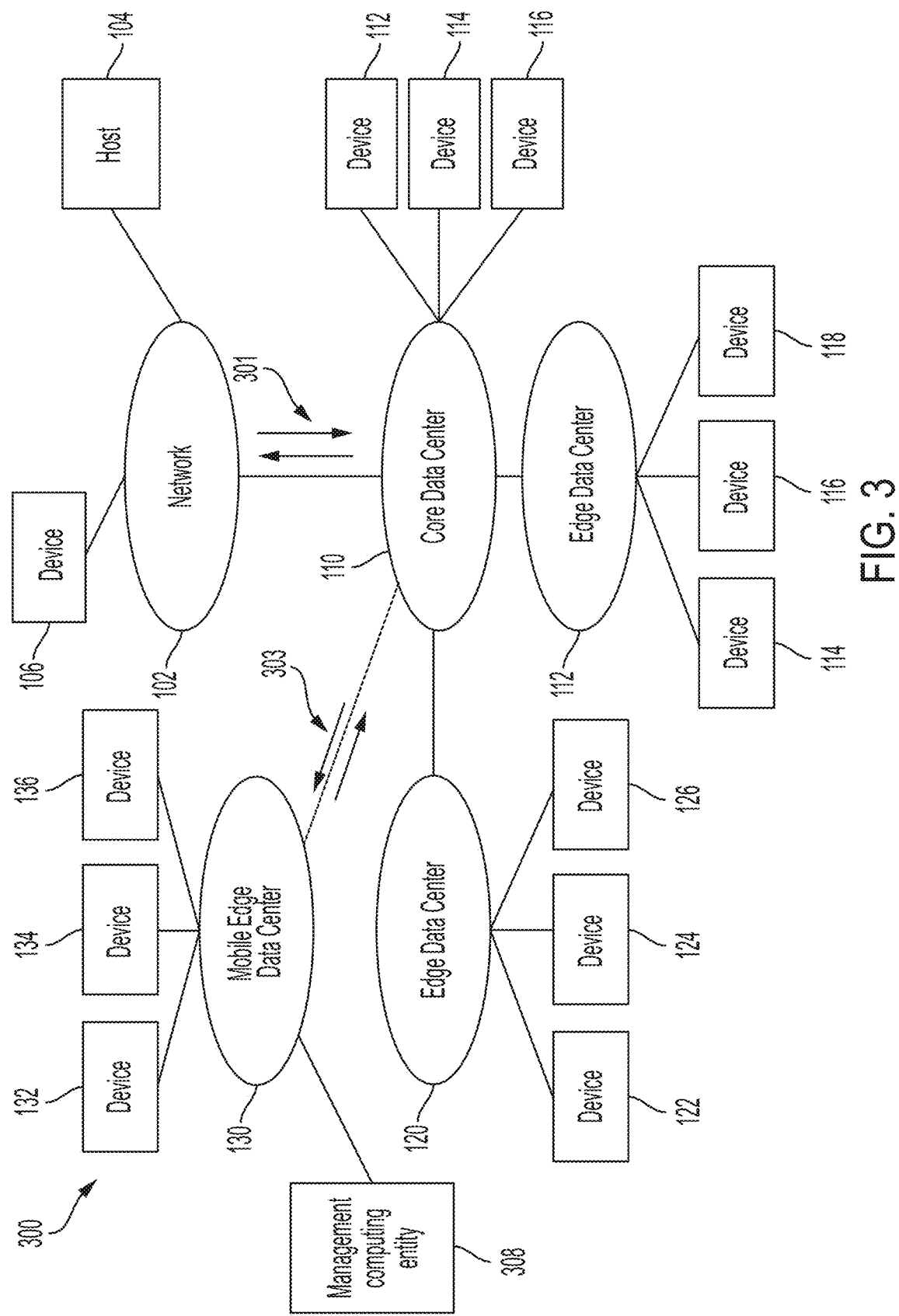
FIG. 3 depicts another diagram of the representative network architecture of FIG. 1 in which aspects of the disclosed embodiments can operate in connection with a third topology including the management computing entity communicatively coupled to an edge data center, in accordance with example embodiments of the disclosure.

FIG. 3 depicts another diagram of the representative network architecture of FIG. 1 in which aspects of the disclosed embodiments can operate in connection with a third topology, in accordance with example embodiments of the disclosure. In particular, diagram 300 depicts many of the same elements as FIG. 1, described above. However, diagram 300 shows the management computing entity 308 which can be connected to an example edge data center such as mobile edge data center 130 in this third topology instead of the network 102 as in FIG. 1 or core data center 110 as in FIG. 2. Once again, this topology reflects the possibility that the management computing entity can reside at different locations on the network architecture (e.g., an edge data center versus the core data center and/or the network).

In some embodiments, diagram 300 further shows that the network 102 can initiate a workload request via the first data transmission 301 to the core data center 110. For example, a device (e.g., device 106) or a host (e.g., host 104) connected to the network 102 can generate the workload, which can be processed by the network 102 and initiate the workload request via the data transmission 301. The management computing entity 308 can again monitor network parameters (e.g., data transmission rates, network portion utilizations, combinations thereof, and/or the like, further shown and described in connection with FIG. 7, below) associated with the network architecture (e.g., including, but not limited to, network parameters associated with the core data center 110 and various edge data centers such as mobile edge data center 130, edge data center 120, and/or edge data center 112).

Based on the results of the monitoring, the management computing entity 308 can determine to maintain at least a portion of the workload the mobile edge data center 130. In some examples, management computing entity 308 can further route a different portion of the workload to the core data center 110, edge data center 112, and/or edge data center 120. As previously noted, to make the determination of where to route the workload, the management computing entity 308 can run a model of the network architecture and portions of the network to determine various latencies associated with different portions of the network architecture, to be further shown and described in connection with FIGS. 7-9, below. Optionally, the management computing entity 308 can use the latencies as inputs to a machine learning component (to be further shown and described in connection with FIGS. 4 and 5, below), to determine the optimal routing between core data center and edge data center computation of the workload.

Figure 4:
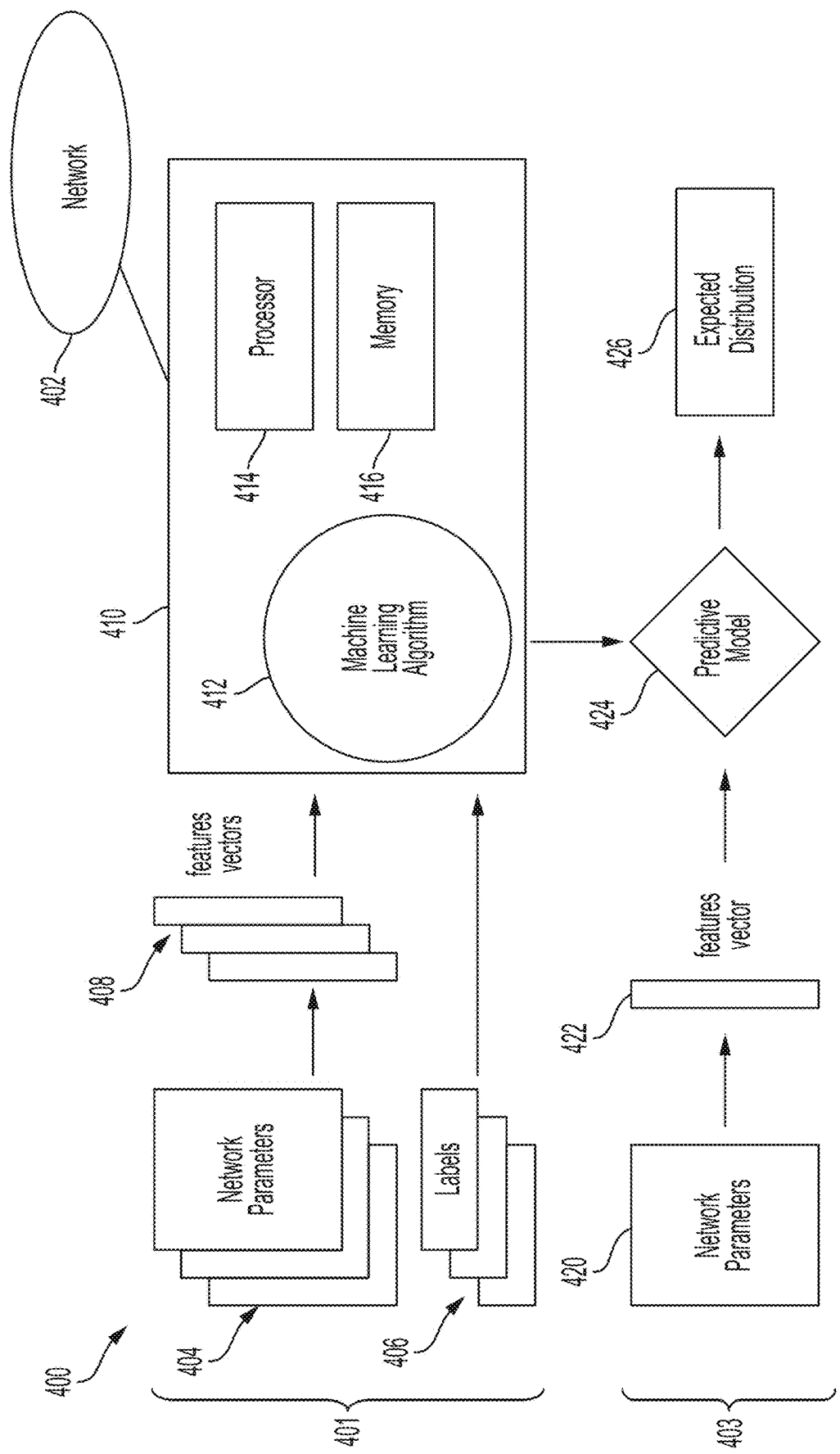
FIG. 4 depicts a diagram illustrating how the disclosed systems can implement a supervised machine learning approach for determining distributions of workloads across different portions of a network architecture, in accordance with example embodiments of the disclosure.

FIG. 4 depicts a diagram of a supervised machine learning approach for determining distributions of workloads across different portions of a network architecture, in accordance with example embodiments of the disclosure. In particular, diagram 400 shows a supervised machine learning approach to determining a distribution of a given workload to a core data center and one or more edge data center based on expected latencies and network parameters. More specifically, diagram 400 shows a training component 401 of the machine learning approach, the training component 401 including a network 402, network parameters 404, labels 406, feature vectors 408, management computing entity 410, machine learning component 412, processor 414, and memory 416, to be described below. Further diagram 400 shows an inference component 403 of the machine learning approach, the inference component 403 including network parameters 420, feature vector 422, predictive model 424, and expected distribution 426, also to be described below.

Now turning to the various components shown in diagram 400, a more detailed description is described. In particular, network 402 can be similar to network 102, shown and described in connection with FIG. 1, above. In some examples, the network 402 can be communicatively coupled to the management computing entity 410. In some embodiments, network parameters 404 can include raw data transmitted on various portions of a network architecture between various entities such as those shown and described in connection with FIG. 1, In some examples, the raw data can include, but not be limited to, workloads, data transmissions, latencies, and/or data transmission rates on portions of the network.

In some embodiments, labels 406 can represent optimal distributions of a given workload across a core data center and one or more edge data centers in an example network architecture having a particular configuration. In some embodiments, the labels 406 can be determined using the results of a model, such as the model 702 to be shown and described in connection with FIG. 7, below. In various aspects, labels 406 can thereby be used to train a machine learning component 412, for example, to predict an expected distribution 426 of a given future workload across a core data center and one or more edge data centers during the inference component 403.

In some embodiments, feature vectors 408 can represent various parameters of interest (e.g., latencies, and/or data transmission rates) that can be extracted from the raw data that may be part of the network parameters 404. In some examples, the feature vectors 408 can represent individual measurable properties or characteristics of the transmissions observed by the management computing entity over the network architecture, for example, as described in connection with FIG. 7, below.

In other embodiments, management computing entity 410 can be communicatively coupled to the network 402, and can include a machine learning component 412, a processor 414, and memory 416. In particular, the machine learning component 412 can use any suitable machine learning technique to generate a predictive model 424 of an expected distribution 426 for processing a given workload across a core data center and one or more edge data centers. Non-limiting machine learning techniques can include, but not be limited to, a supervised learning technique (shown and described in connection with FIG. 4), an unsupervised learning technique (shown and described in connection with FIG. reinforcement learning technique, a self-learning technique, a feature learning technique, an association rules technique, combinations thereof, and/or the like. Additional non-limiting machine learning techniques can include, but not be limited to, specific implementations such as artificial neural networks, decision trees, support vector machines, regression analysis techniques, Bayesian network techniques, genetic algorithm techniques, combinations thereof, and/or the like.

As noted, diagram 400 includes an inference component 403. In particular, the inference component 403 may be similar to the training component 401 in that network parameters 420 are received, feature vectors are extracted (e.g., by the management computing entity 410), and a machine learning component 410 executing a predictive model 424 is used to determine an expected distribution 426 of processing of a given workload across a core data center and one or more edge data centers. One difference between the inference component 403 and the training component 401 is that the inference component may not receive labels (e.g., labels 406) to train the machine learning component to determine the distribution. Accordingly, in the inference component 403 mode of operation, the management computing entity 410 can determine the expected distribution 426 of the given workload live. Subsequently, if an error rate (defined, for example, based on the overall latency reduction for a given workload) is below a predetermined threshold, the machine learning component 412 can be retrained using the training component 401 (e.g., with different label 406 associated with different or similar network parameters 404). The inference component 403 can be subsequently run to improve the error rate to a be above the predetermined threshold.

Figure 5:
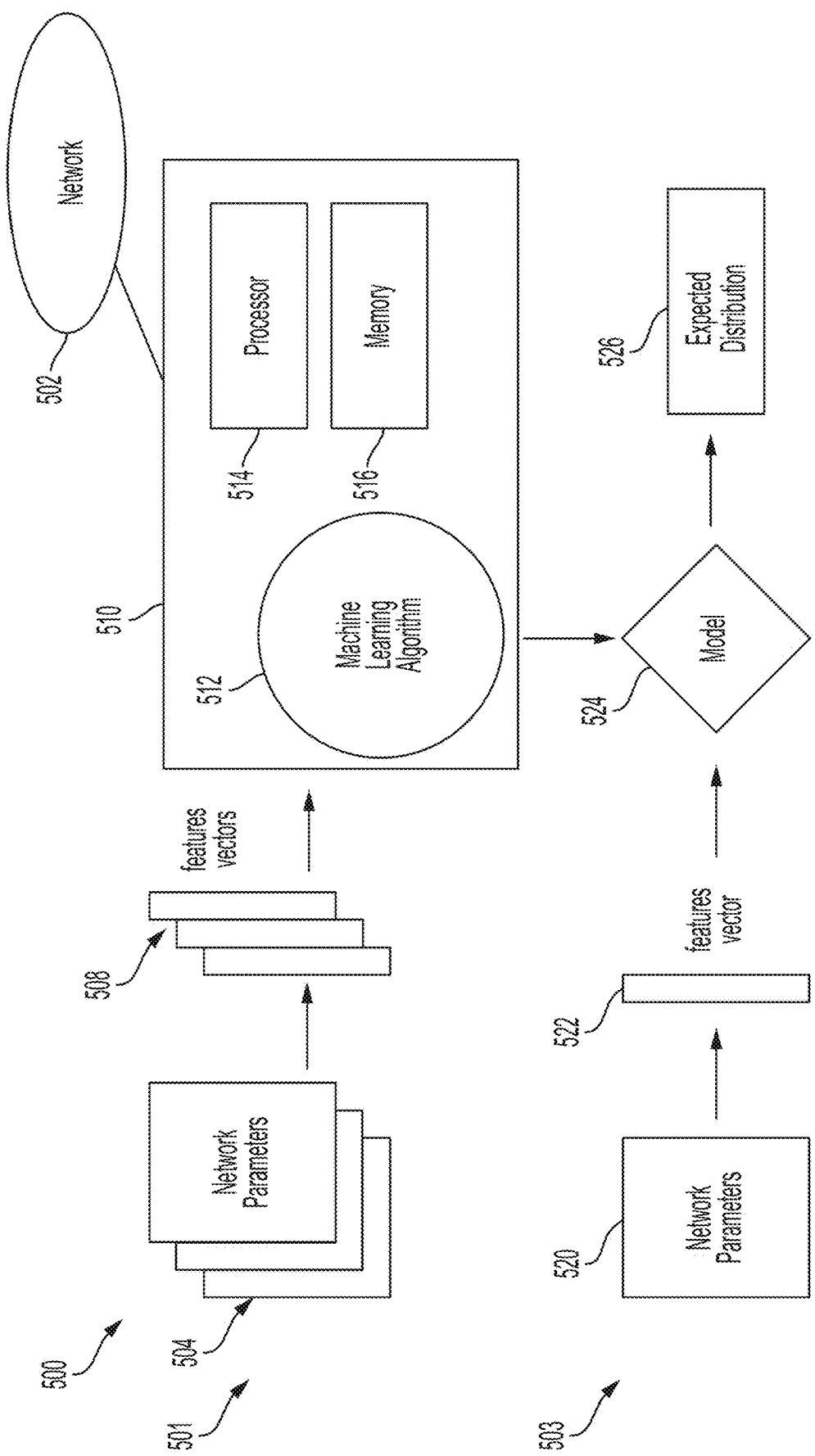
FIG. 5 depicts a diagram illustrating how the disclosed systems can implement an unsupervised machine learning approach for determining distributions of workloads across different portions of a network architecture, in accordance with example embodiments of the disclosure.

FIG. 5 depicts a diagram of an unsupervised machine learning approach for determining distributions of workloads across different portions of a network architecture, in accordance with example embodiments of the disclosure. In particular, diagram 500 shows a network 502 connected to the management computing entity 510. Further, diagram 500 includes a training component 501 of the machine learning approach, including network parameters 504, feature vectors 508, a management computing entity 510 having a machine learning component 512, processor 514, and memory 516. Moreover, diagram 500 includes a training component 503 of the machine learning approach, including network parameters 520, feature vector(s) 522, a model 524, and an expected distribution 526 of a workload across core and edge data centers.

Now turning to the various components shown in diagram 500, a more detailed description is provided. In particular, network 502 can be similar to network 102, shown and described in connection with FIG. 1, above. In some examples, the network 502 can be communicatively coupled to the management computing entity 510. In some embodiments, network parameters 504 can include raw data that is transmitted on various portions of a network architecture such as that shown and described in connection with FIG. 1. In some examples, the raw data can include, but not be limited to, workloads, data transmissions, latencies, and/or data transmission rates on portions of the network, combinations thereof, and/or the like.

In some embodiments, in contrast to the labels 406 representing optimal distributions of a given workload across a core data center and one or more edge data centers shown and described in connection with FIG. 4, above, training component 501 may not have such labels. Rather, the management computing entity 510 can the train the machine learning component 512 (for example, to predict an expected distribution 526 of a given future workload across a core data center and one or more edge data centers using the inference component 503) without any labels.

In some embodiments, feature vectors 508 can represent various parameters of interest (e.g., latencies, and/or data transmission rates) that can be extracted from the raw data that may be part of the network parameters 504. In some examples, the feature vectors 508 can represent individual measurable properties or characteristics of the transmissions observed by the management computing entity over the network architecture, for example, as described in connection with FIG. 7, below.

In other embodiments, management computing entity 510 can be communicatively coupled to the network 502, and can include a machine learning component 512, a processor 514, and memory 516. In particular, the machine learning component 512 can use any suitable machine learning technique to generate a model 524 of an expected distribution 526 of processing a given workload across a core data center and one or more edge data centers.

As noted, diagram 500 includes an inference component 503. In particular, the inference component 503 may be similar to the training component 501 in that network parameters 520 are received, feature vectors 522 are extracted (e.g., by the management computing entity 510), and a machine learning component 510 executing a model 524 is used to determine an expected distribution 526 of processing of a given workload across a core data center and one or more edge data centers. Accordingly, in the inference component 503 mode of operation, the management computing entity 510 can determine the expected distribution 526 of the given workload live. Subsequently, if an error rate (defined, for example, based on the overall latency reduction for a given workload) is below a predetermined threshold, the machine learning component 512 can be retrained using the training component 501. The inference component 503 can be subsequently run to improve the error rate to a be above the predetermined threshold.

Figure 6:
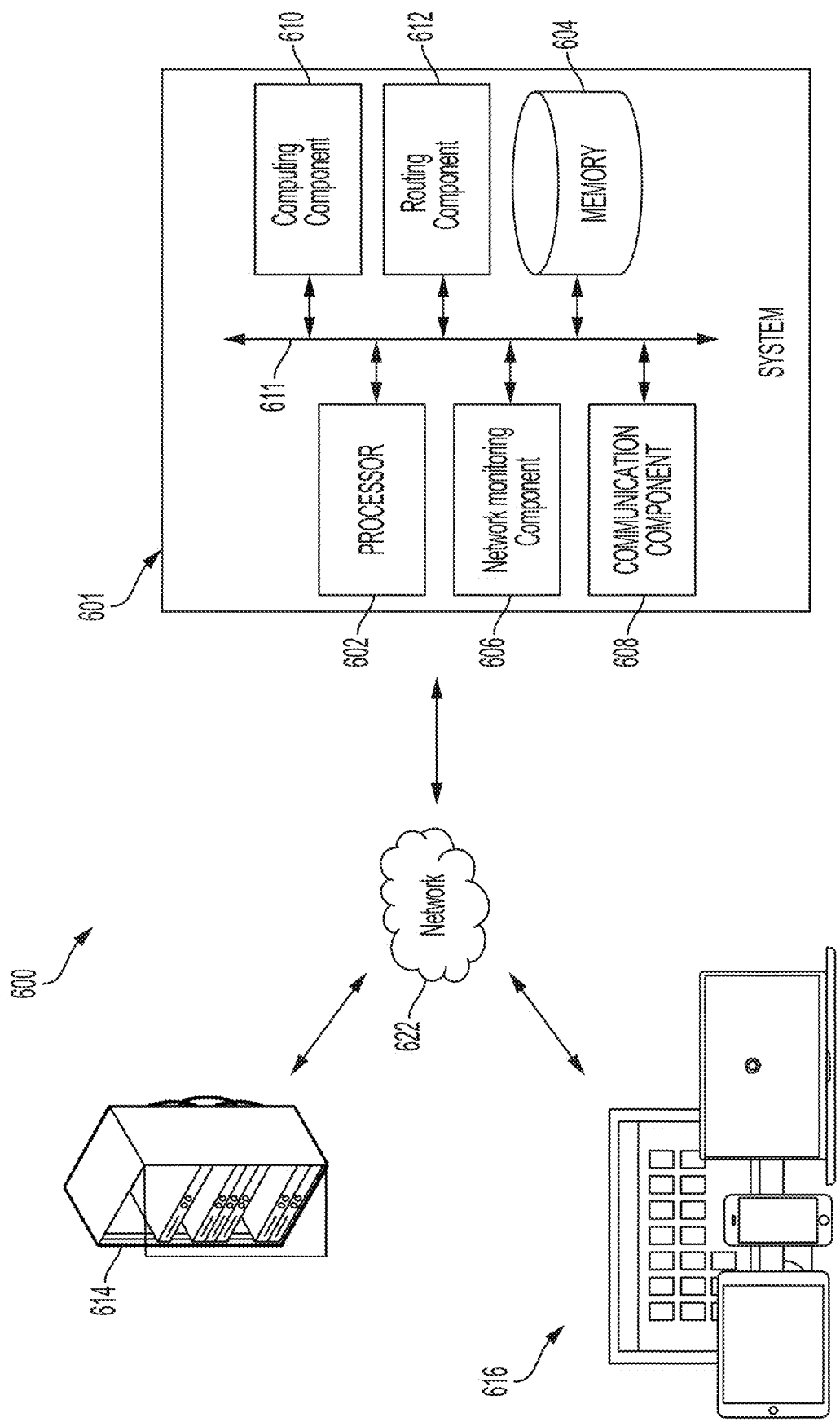
FIG. 6 depicts a diagram of a system representing a management computing entity including a network monitoring component, a computing component, and a routing component that can perform various operations of the disclosed embodiments in association with a network, servers, and user devices to optimally distribute workloads across different portions of a network architecture, in accordance with example embodiments of the disclosure.

FIG. 6 depicts a diagram of a system representing a management computing entity that can perform various operations of the disclosed embodiments in association with a network, servers, and user devices, in accordance with example embodiments of the disclosure. Diagram 600 shows a management computing entity 601, a processor 602, a memory 604, a network monitoring component 606, a communication component 608, a computing component 610, a routing component 612, a network 622, a server 614, and devices 616.

In particular, management computing entity 601 can be similar, but not necessarily identical to, management computing entity 108 shown and described in connection with FIG. 1, above. Further details of the management computing entity 601 are shown and described in connection with FIGS. 13 and 14, below.

In some embodiments, computing component 610 can load and run various core and edge computing scenarios from associated configuration files. In addition, computing component 610 can model certain aspects of the MEC architecture by using libraries of classes that abstract aspects of the network, mobility for devices on the network (e.g., to determine the location of mobile devices associated with the networks over time and/or to represent device locations using predetermined models, for example, using a nomadic mobility model where the location of the devices are changed periodically instead of a continuous location update), and edge orchestrators. In some embodiments, computing component 610 can include a load generator component (not shown) to generate example tasks for the given network configuration along with a class to decide task generation patterns via a task list. In some embodiments, the load generator component can model mobile devices generating tasks in certain active periods and remaining inactive in certain idle periods, for example, in accordance with a predetermined task interarrival times, in which the idle and active periods can be supplied based on network traffic monitoring or user input.

In some embodiments, the computing component 610 can include an edge orchestrator component (not shown) that uses the information collected from the other components to decide how and where to handle incoming client requests. In particular, the edge orchestrator component can implement any suitable algorithm (e.g., a first/next/best/worst/random (f/n/b/w/r) fit algorithms while assigning requests to one or more edge devices. Further, the edge orchestrator component can model offloading VMs to edge data centers based on predetermined policies associated with the algorithm.

System 600 can optionally include a server device, one or more networks and one or more devices (not shown). The system 600 can also include or otherwise be associated with at least one processor 602 that executes computer executable components stored in memory 604. The system 600 can further include a system bus 611 that can couple various components including, but not limited to, the network monitoring component 606, the communication component 608, the computing component 610, the routing component 612, and/or other components (not shown) that are operatively coupled to one another.

Aspects of systems (e.g., system 600 and the like), apparatuses or processes explained in this disclosure can constitute machine-executable component(s) embodied within machine(s), e.g., embodied in one or more computer readable mediums media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

In some examples, the system 600 can include the management computing entity as implemented using any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the system 600 and/or any other suitable device that can employ information provided by system 600. It is to be appreciated that system 600, components, models or devices can be equipped with a communication component 618 that enable communication between the system, components, models, devices, etc. over one or more networks (e.g., over a cloud computing environment including core and edge data centers).

In some embodiments, the network monitoring component 606 may include software and/or hardware components that can capture and/or log traffic that passes over a network or part of a network. Packet capture can refer to the process of intercepting and logging traffic. As data streams flow across the network, the network monitoring component 606 can capture the packets and, if needed, can decode the packet's raw data, showing the values of various fields in the packet, and analyzes its content according to the appropriate specifications. In some embodiments, the network monitoring component 606 can serve to capture and/or determine various network parameters that can be used to route workloads to different portions of the network.

In some aspects, communication component 608 can include various components (e.g., transceivers, antennas, etc.) to communicate information (e.g., data and/or workloads) to various devices on the network architecture. Further details of the communication component 608 are shown and described in connection with FIG. 14, below.

The various components (e.g., the network monitoring component 606, the communication component 608, the computing component 610, the routing component 612, and/or other components) of system 600 can be connected either directly or via one or more networks (e.g., through the communication component 618. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other compo s rather than included within parent components. Further yet, one or more components and/or sub-components can be combined into a single component providing aggregate functionality. The components can also interact with one or more other components not specifically described herein for the sake of brevity, but known by those of skill in the art.

In some aspects, the computing component 610 may use artificial intelligence (AI) (e.g., the machine learning components shown and described above in connection with FIGS. 4 and 5) to determine the routing of workloads between the portions of a network architecture, for example, by monitoring data flow over different portions of the network over time (e.g., historical data) for enhanced workload routing. Accordingly, embodiments of devices, management computing entity, and/or related components described herein can employ AI to facilitate automating one or more features described herein. The components can employ various AI-based schemes for carrying out various embodiments/examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations. In some aspects, the neural network can include, but not be limited to, at least one of a long short term memory (LSTM) neural network, a recurrent neural network, a time delay neural network, or a feed forward neural network.

A classifier can map an input attribute vector, $z=(z1, z2, z3, z4, \ldots, zn)$, to a confidence that the input belongs to a class, as by $f(z)=confidence(class)$. Such classification can employ a probabilistic and/or statistical-based analysis to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

In some embodiments, the routing component 612 can include a component that determines to transmit workloads and/or associated data to different portions of the network. In some aspects, the routing component 612 may base the transmissions on the distributions determined by the modelling and/or machine learning techniques variously described herein to route the transmission accordingly. In some embodiments, the routing component 612 can encapsulate the packets associated with appropriate header and/or metadata information to transmit them to different portions of the network (e.g., a wireless portion of the network or a wired portions of the network). Network 622 can be similar, but not necessarily identical to, network 102 shown and described in connection with FIG. 1, above. In some examples, the routing component 612 and/or the computing component 610 can throttle at least one of (1) a transmission rate associated with data traffic to and from the data center, (2) a transmission rate associated with data traffic to and from the edge data center, (3) a transmission rate associated with data traffic to and from a device associated with the edge data center, or (4) a transmission rate associated with data traffic to and from a device associated with the data center based on the difference between a first programmatically expected latency associated with the core data center or a second programmatically expected latency associated with the edge data center.

In some embodiments, server 614 can represent a server on the network, a core data center, and/or an edge data center. In particular, server 614 can include or be configured to execute, in some examples, at least portions of the management computing entity 601. For instance, the management computing entity 601 can reside on a server representing a host of a network as shown and described in connection with FIG. 1, above. Alternatively or additionally, the management computing entity 601 can reside on a server of a core data center as further shown and described in connection with FIG. 2, above. Further, the management computing entity 601 can reside on a server of an edge data center as further shown and described in connection with FIG. 3, above. In other embodiments, various portions of the management computing entity 601 can reside at least partially on one or more servers (or devices) associated with the network, core data center, and/or edge data center, which can together form a complete functionality of a management computing entity 601. Further, Devices 616 can include user devices (e.g., mobile phones, laptops, tablets, etc.) and can be similar, but not necessarily identical to, devices shown and described in connection with FIG. 1, above and further described in connection with FIG. 12 below.

Figure 7:
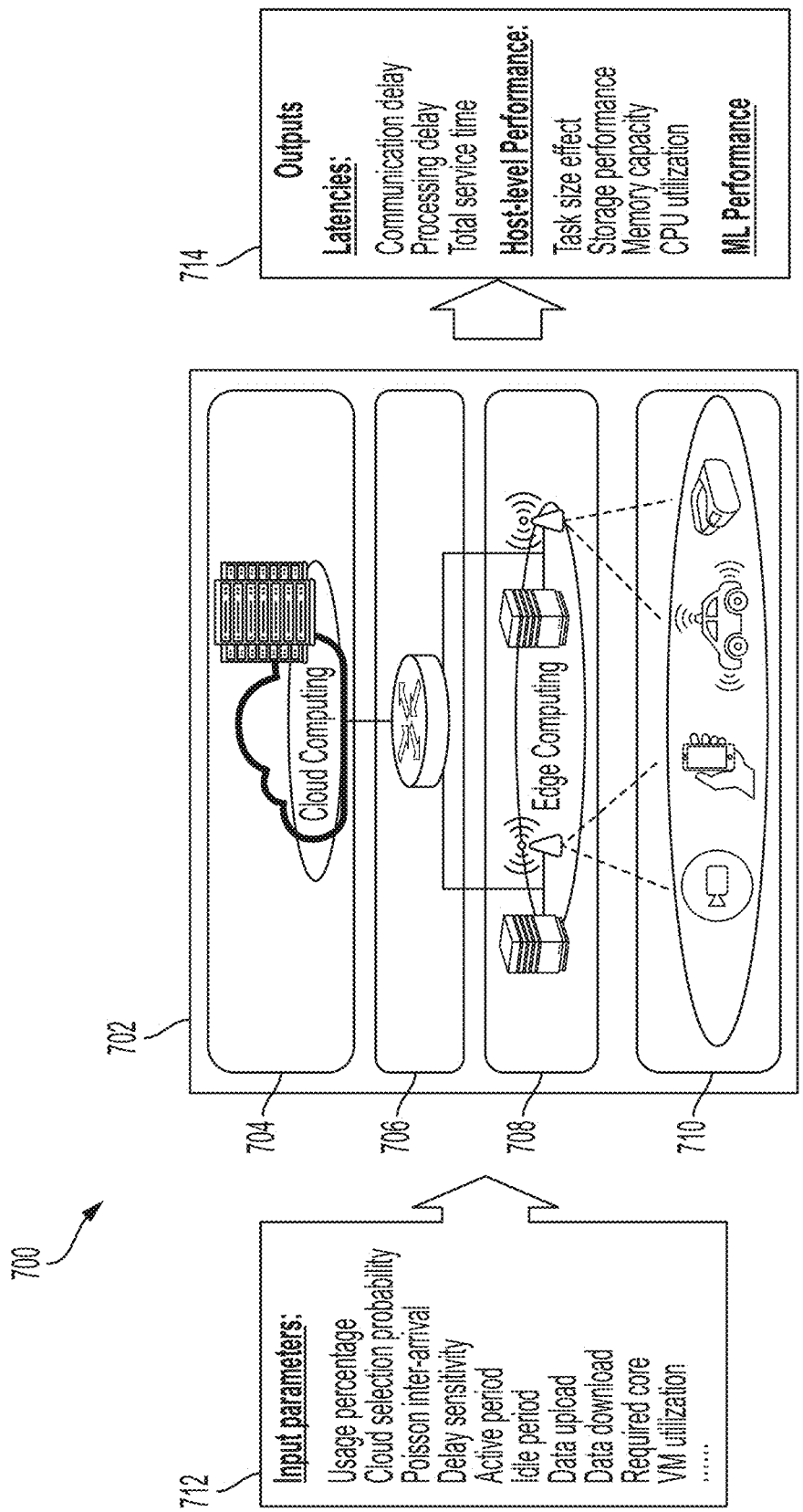
FIG. 7 depicts a diagram of a model for determining various example network parameters including network latencies and host-level performance metrics of an exemplary network architecture based on various example input network parameters, in accordance with example embodiments of the disclosure.

FIG. 7 depicts a diagram of an example model for determining network parameters such as latencies and host-level performance metrics of an exemplary network architecture based on various input network parameter, in accordance with example embodiments of the disclosure. In some embodiments, diagram 700 shows a model 702, the model 702 including a cloud computing portion 704, a load balancer portion 706, an edge computing portion 708, a user devices portion 710. Further, diagram 700 depicts various input parameters 712 that can be fed into the model 702. The model 702 can output various output parameter 714. In some examples, the output parameters 714 may be used by a machine learning technique (e.g., the machine learning techniques shown and described in connection with FIGS. 4 and 5, above).

Turning now to a more detailed description of the elements of diagram 700, the model 702 can include a cloud computing portion 704. In particular, the cloud computing portion 704 can include the core data center and/or a network similar to network 102 shown and described in connection with FIG. 1, above. Further, the load balancer portion 706 can include a component that can serve to improve the distribution of workloads across multiple computing resources, such as one or more edge data centers and/or other servers associated with the network. Moreover, the edge computing portion 708 can include various servers and storage devices, similar, but not necessarily identical to, server 614 shown and described in connection with FIG. 6, above. In some aspects, the user devices portion 710 can include various user device (e.g., a mobile phones, laptops, IoT devices, combinations thereof, and/or the like) as further shown and described in connection with FIG. 12, below.

In some embodiments, the input parameters 712 can include a usage percentage, which can refer to percentage that various devices have historically used or are projected to use various components on the network architecture. In another aspect, the input parameters 712 can include a cloud selection probability, which can refer to a probability that a given workload is at least originally assigned to a core data center. Further, the probability can be modelled by any suitable mathematical and/or statistical process (e.g., Poisson process). In an example embodiment, the input parameters 712 can include a Poisson inter-arrival value for a statistical process that models the probability, the inter-arrival value referring to the time difference between events representing workload assignments from various devices on the network (e.g., devices user device portion 710). In another aspect, the input parameters 712 can include a delay sensitivity value, which can refer to a numerical value (e.g., a number between 0 and 10) that can represent the relative sensitivity of a given workload to delays. For example, for video streaming applications, a delay sensitivity may be higher than an email application, where a delay may not be as disruptive to a user's experience.

In some examples, the input parameters 712 can include an active period, which can refer to a period of time in which certain portions of the network are active (e.g., responsive to workloads and other requests) as opposed to dormant. In some examples, this parameter may be reflected in different activity cycles that capture the relative loads on the overall network architecture over a period of time. In some embodiments, the input parameters 712 can include an idle period, which can refer to a period of time in which certain portions of the network are dormant as opposed to active. Again, in some examples, this parameter may be reflected in different activity cycles that capture the relative loads on the overall network architecture over time.

In various embodiments, the input parameters 712 can include a data upload rate or amount, which can refer to a rate at which devices and/or portions of the network architecture can upload data from one node to another. For example, the data upload rate can reflect the speed with which a user device (e.g., a mobile phone) uploads images to a server on a core data center or an edge data center. In some examples, the input parameters 712 can include a data download rate or amount, which can refer to a rate at which devices and/or portions of the network architecture can download data from one node to another. For example, the data download rate can reflect a speed with which a user device (e.g., a mobile phone) can download images and/or video from a server on a core data center or an edge data center. In another aspect, the input parameters 712 can include a required core use, which can refer to the amount of core processors that are needed to execute a particular workload. For example, certain workloads may require a predetermined number of dedicated processors to execute tasks, the tasks having varying importance. In various embodiments, the input parameters 712 can include a VM utilization ratio, which can refer to an expected use of virtual machines by the workloads processed by the core and/or edge data centers.

In another aspect, the output parameters 714 can include various latencies associated with processing workloads on the network architectures. In particular, the output parameters 714 can include a communication delay, which can refer to delays caused by latencies in communications between portions of the network over various media. For example, the communication delay may reflect delays due to wireless transmissions or Ethernet transmissions. In various embodiments, the output parameters 714 can include a processing delay, which can refer to delays associated with completing a given task on a portion of the network (e.g., edge or core data centers). In some embodiments, the output parameters 714 can include a total service time, which can refer to the overall time needed to execute and process a given workload. In various embodiments, the output parameters 714 can include host-level performance metrics. In another aspect, the host-level performance metrics can include a task size effect, which can refer to delays associated with tasks having a particular size. Examples of the effect of task size on the completion of a workload are further shown and described in connection with FIGS. 17, 18, and 19, below.

In some examples, the host-level performance metrics can include a storage performance, which can refer to a metric that characterizes the efficiencies and performance of storage devices on the network (e.g., solid state drives, hard drives, flash drives, combinations thereof, and/or the like). In various embodiments, the host-level performance metrics can include a memory capacity, which can refer to an amount of memory that is used by the host in executing a particular workload. In another aspect, the host-level performance metrics can include a central processing unit (CPU) utilization, which can refer an amount of processor usage that is used by the host in executing a particular workload. In various embodiments, the host-level performance metrics can include a machine learning performance metric, which can refer to efficiencies, power usage, and/or delays associated with performing various machine learning tasks in executing a particular workload. In some embodiments, the machine learning performance metric can include efficiencies, power usage, and/or delays associated with routing data by the management computing entity to various portions of the network architecture.

Figure 8:
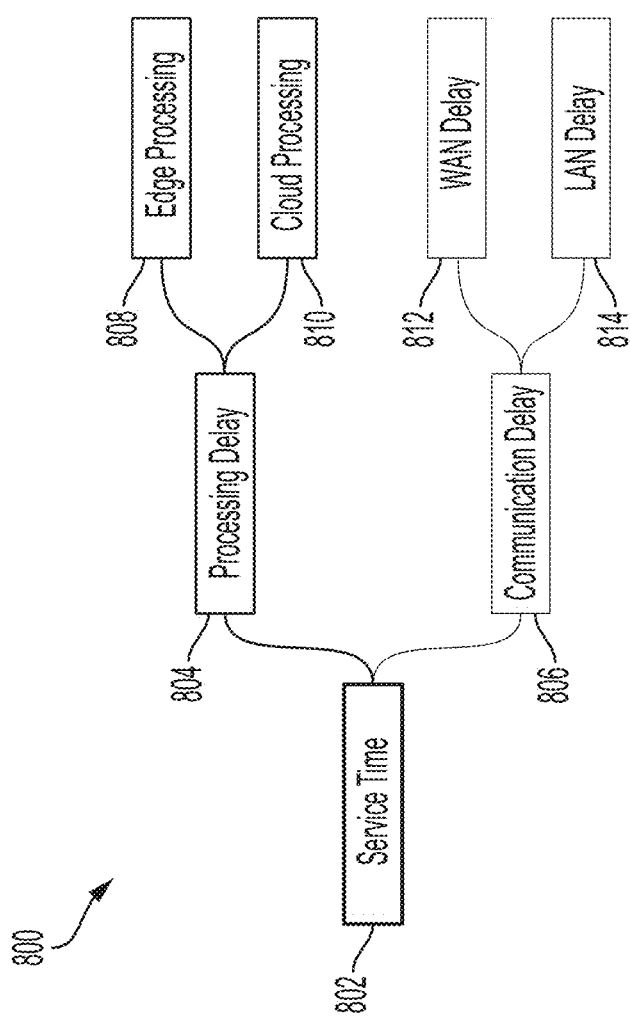
FIG. 8 depicts a diagram of some example latencies communication and processing latencies) associated with different portions of a network architecture that can collectively contribute to an overall service time delay for requests and/or workloads executed on the network architecture, in accordance with example embodiments of the disclosure.

FIG. 8 depicts a diagram of example latencies associated with different portions of a network architecture, in accordance with example embodiments of the disclosure. In particular, diagram 800 shows a service time 802, which can include a processing delay 804 and a communication delay 806. The processing delay 804 can include an edge processing 808 delay and a cloud processing 810 delay. Further, the communication delay 806 can include a WAN delay 812 and a LAN delay 814. The various delays are described further below.

In some embodiments, the service time 802 can include the overall time needed to execute and process a given workload. In some examples, the processing delay 804 can include delays associated with completing a given task on a portion of the network (e.g., edge or core data centers). In an embodiment, the communication delay 806 can include delays caused by latencies in communications between portions of the network over various media. For example, the communication delay may reflect delays due to wireless transmissions or Ethernet transmissions. In some aspects, the edge processing 808 delay can include delays associated with completing a given task on an edge data center. In some embodiments, the cloud processing 810 delay can include delays associated with completing a given task on a core data center. In other aspects, the WAN delay 812 can include a delay associated with transmitting a given workload and/or associated data on a WAN. In some embodiments, the LAN delay 814 can include a delay associated with transmitting a given workload and/or associated data on a LAN.

In some examples, the disclosed systems can generally seek to shorten the communication route and decrease communication delay for data that is being processed. In some examples, when there are a relatively large amount of requests that flow into the a given edge server of an edge data center that requests a relatively heavy computing and/or storage resources, the edge processing 808 delay may be lengthened as compared to the cloud processing 810 delay. Accordingly, by implementing one or more of the disclosed embodiments, the disclosed systems can use a model and/or machine learning techniques to route workloads to various edge and core data centers accordingly to minimize one or more of the above described delays/latencies to reduce the overall service time 802 of a workload executed on a network architecture (e.g., MFC network architecture).

Figure 9:
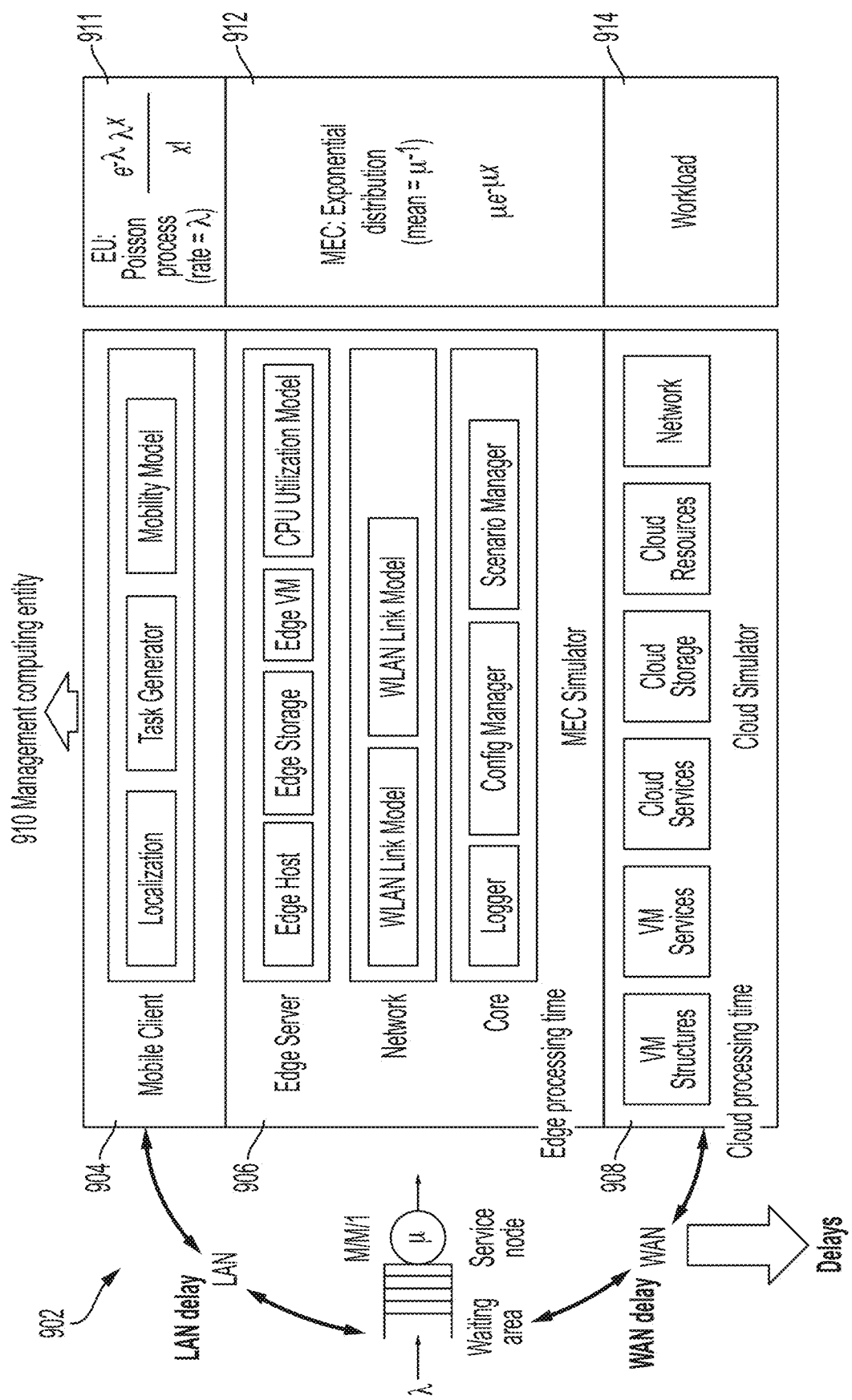
FIG. 9 depicts a diagram of various aspects of a model for determining example network parameters such as latencies by using exemplary mathematical processes to represent certain features of communications on portions of a network architecture, in accordance with example embodiments of the disclosure.

FIG. 9 depicts a diagram of another model for determining network parameters such as latencies using mathematical models to represent aspects of various communications on portions of a network architecture, in accordance with example embodiments of the disclosure. In particular, diagram 902 includes a management computing entity 910 which can include a mobile client 904 modelling component, an edge processing time 906 modelling component, and a cloud processing time 908 modelling component. Further, the mobile client 904 modelling component can use a statistical model such as a Poisson process 911, the edge processing time 906 modelling component can use an exponential distribution 912. Further, the cloud processing time 908 can be based on a workload 914.

In some embodiments, the mobile client 904 component can serve to model the various devices connected to the edge data center and/or core data center. In particular, the mobile client 904 component can include a mobility model that can refer to an abstract class used for calculating the location of each mobile device with respect to time. The mobility model can implement a basic nomadic mobility model, where the device places are changed from time to time instead of a continuous location update. The location of the mobile devices can be updated according to the mobility component.

Further, the mobile client 904 component can further include a task generator component can generate tasks for the given device and/or network configuration. The task generator component can include an abstract class used for deciding the task generation pattern via a task list. It implements a basic load generator model, where the mobile devices generate tasks during the active period and wait in the idle period. As shown in Poisson process 911, each end user device can be modelled to produce workloads according to a Poisson process with rate $\lambda$. Further, arrivals can be modelled to occur at rate $\lambda$ according to a Poisson process and move the process from state a given state to the next state.

The MEC simulator 906 can include a core modelling component including a logger, a configuration manager, and/or a scenario manager for loading and running edge computing scenarios from configuration files. In addition, the logger can be used to save the simulation results files. The MFC simulator 906 can further include a networking component having an example wireless network model (e.g., a WLAN link model and a WAN link model). The MEC simulator 906 can further include an edge server including edge host, an edge storage, an edge VM, and a CPU utilization model.

The MFC simulator 906 component can include a network component that can handle the transmission delay in a WLAN and WAN by considering both upload and download data over the network. The network component can include an abstract class used for calculating the network delay between devices. In some embodiments, the network component can implement a M/M/1 queue model for LAN and WAN communications.

In some examples, the edge server component can include an edge host, edge virtual machine, edge server manager, and VM allocation policy models. The edge server component can determine how to handle and where to allocate the incoming client requests. In some embodiments, the task size and the task arrival in each edge server are assumed to be independent and identically distributed according to an exponentially distribution with mean $\mu^{-1}$, as indicated by exponential distribution 912. In particular, the disclosed systems can model the service time with an exponential distribution with rate parameter $\mu$ using an M/M/1 queue, where $1/\mu$ is the mean service time.

The management computing entity 910 can further include cloud processing time 908 component. In some embodiments, the cloud processing time 908 component can model various portions of the core data center, including, but not limited to, various VM structures and VM services, cloud services, cloud storage components, cloud resources (e.g., compute, network, and/or storage resources), and a networking component, and can be used to model the processing of workloads 914 on a core data center. Moreover, cloud processing time 908 component can include a load balancing (LB) component (not shown) that can use information collected from the other components to decide how and where to handle incoming client requests. The load balancing (LB) component can include an abstract class used for selecting a VM for each client request based on the first/next/best/worst/random (f/n/b/w/r) policies and assigning requests to the edge devices based on the f/n/b/w/r fit algorithms.

Figure 10:
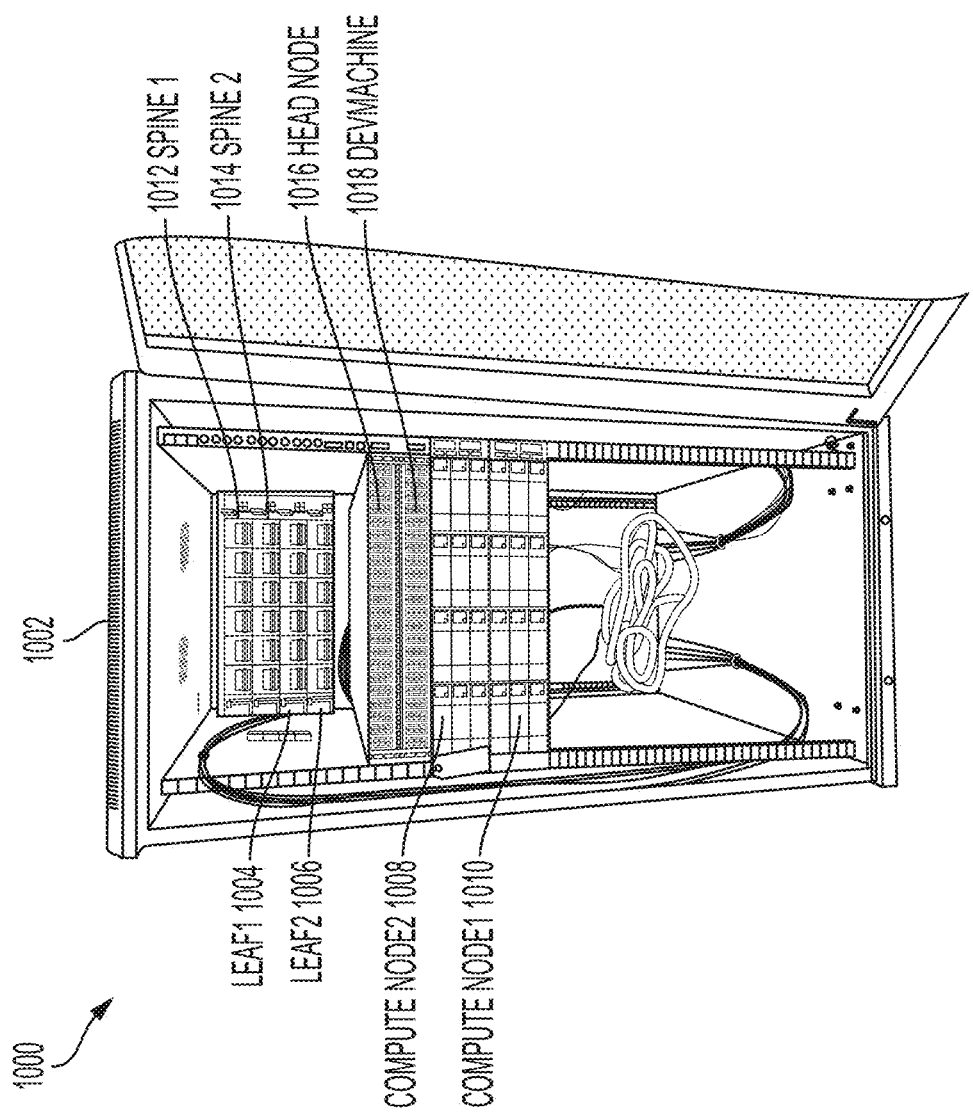
FIG. 10 depicts a diagram of a rack (e.g., part of a server) for implementing at least portions of the disclosed models and techniques described herein, for example, using the management computing entity, in accordance with example embodiments of the disclosure.

FIG. 10 depicts a diagram of a rack for implementing example portions of the disclosed model(s), in accordance with example embodiments of the disclosure. In some examples, diagram 1000 depicts a rack 1002 including an MEC platform that can be built based on the central office re-architected data center design in a 5G network environment according to a two-tier MEC architecture. In some examples, the rack 1002 can be in compliance with various Open Networking Foundation (ONF) protocols and specifications for cellular networks including 5G implementations. As such, the rack can model aspects of 5G specific functionalities, such as split-radio access networks (RANs), RAN user plane and control plane separation (e.g., xRAN), programmable network slicing (e.g., ProgRAN), and mobility management entity (MME) disaggregation. In some example embodiments, the disclosed systems can implement edge clouds to host MEC services.

More specifically, in some examples, rack 1002 can include a physical setup having switches that can form leafs (e.g., leaf1 1004 and leaf2 1006) and spines (e.g., spine1 1012 and spine2 1014) as part of a leaf and spine architectural fabric. Compute nodes compute node1 1010 and compute node2 1008) and the head node 1016 can be connected to a port of one of the leaf switches (e.g., either leaf1 1004 or leaf2 1006). Network devices (access devices and fabric switches) can connect to the network through a dedicated management port, for example, at devmachine 1018. The head node 1016 can be connected both to network (e.g., Internet) and to the other components of the system. The compute nodes (e.g., compute node1 1010 and compute node2 1008) and the switches such as leaves (leaf) 1004 and leaf2 1006) and spines (e.g., spine1 1012 and spine2 1014) may only be connected to the head node 1016, which may provide the switches with software to implement core functionalities. In some examples, blade servers can be used as the head node 1016 and compute nodes (e.g., compute node1 1010 and compute node2 1008). Further, the rack can feature a number of front-serviceable network-enabled storage device (e.g., solid state drive) bays contained in a predetermined form factor (e.g., a 1U form factor). In some embodiments, the storage devices can be designed for all-flash servers and optimized for a given form factor (e.g., 1U designs). Furthermore, the rack can include dual-socket processors and double data rate 4 synchronous dynamic random-access memory (DDR4) dual in-line memory components (DIMMs) of memory to support I/O intensive local workloads, such as real-time analytics and database servers.

Figure 11A:
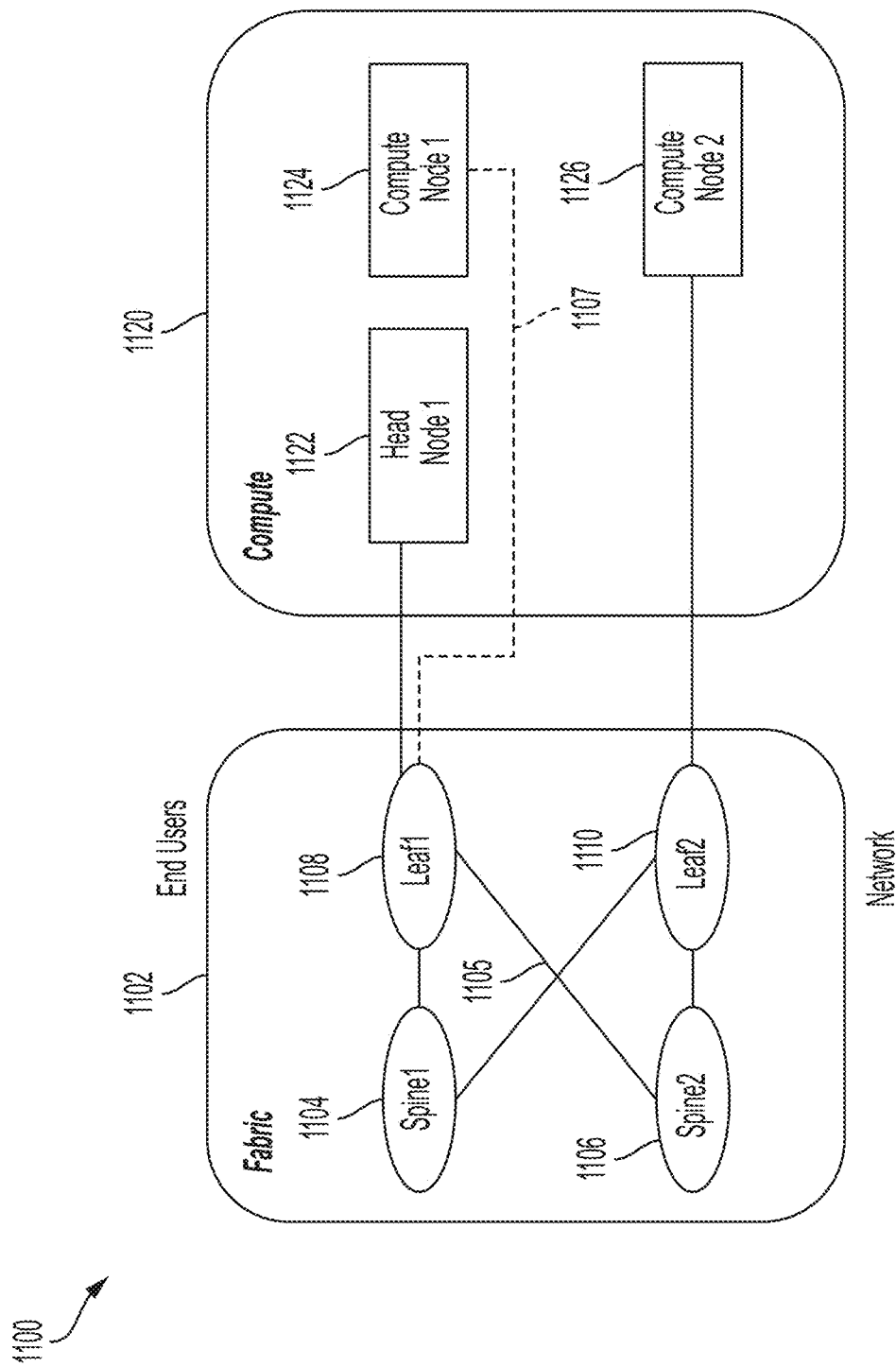
FIG. 11A depicts a diagram of example connections and data paths associated with and/or used by at least portions of the disclosed systems and model(s) in connection with an exemplary network architecture, in accordance with example embodiments of the disclosure.

FIG. 11A depicts a diagram of example connection and data paths associated with the model(s) of the network architecture, in accordance with example embodiments of the disclosure. In some examples, diagram 1100 depicts a high-level logical representation of a typical rack including a switching fabric 1102 having four switches (e.g., spines 1104 and 1106 and leaves 1108 and 1110) and a compute component 1120 having, for example, head and/or compute nodes 1122, 1124, and 1126 (e.g., x86 servers). Further, diagram 1100 includes data plane connections 1105 (e.g., a 40 G data plane connections 1105) where end-user traffic goes from the access devices to the metro network (via path 1107). In some embodiments, user traffic can traverse through different leafs, spines and compute nodes, depending on the services needed, and the nodes are located physically with respect to the devices. As noted, the switches can form a leaf and spine fabric. In some examples, the compute nodes compute node1 1124 and compute node2 1126) and the head node (e.g., head node1 1122) can be connected to a port of one of the leaf switches (e.g., leaf1 1108 and/or leaf2 1110).

Figure 11B:
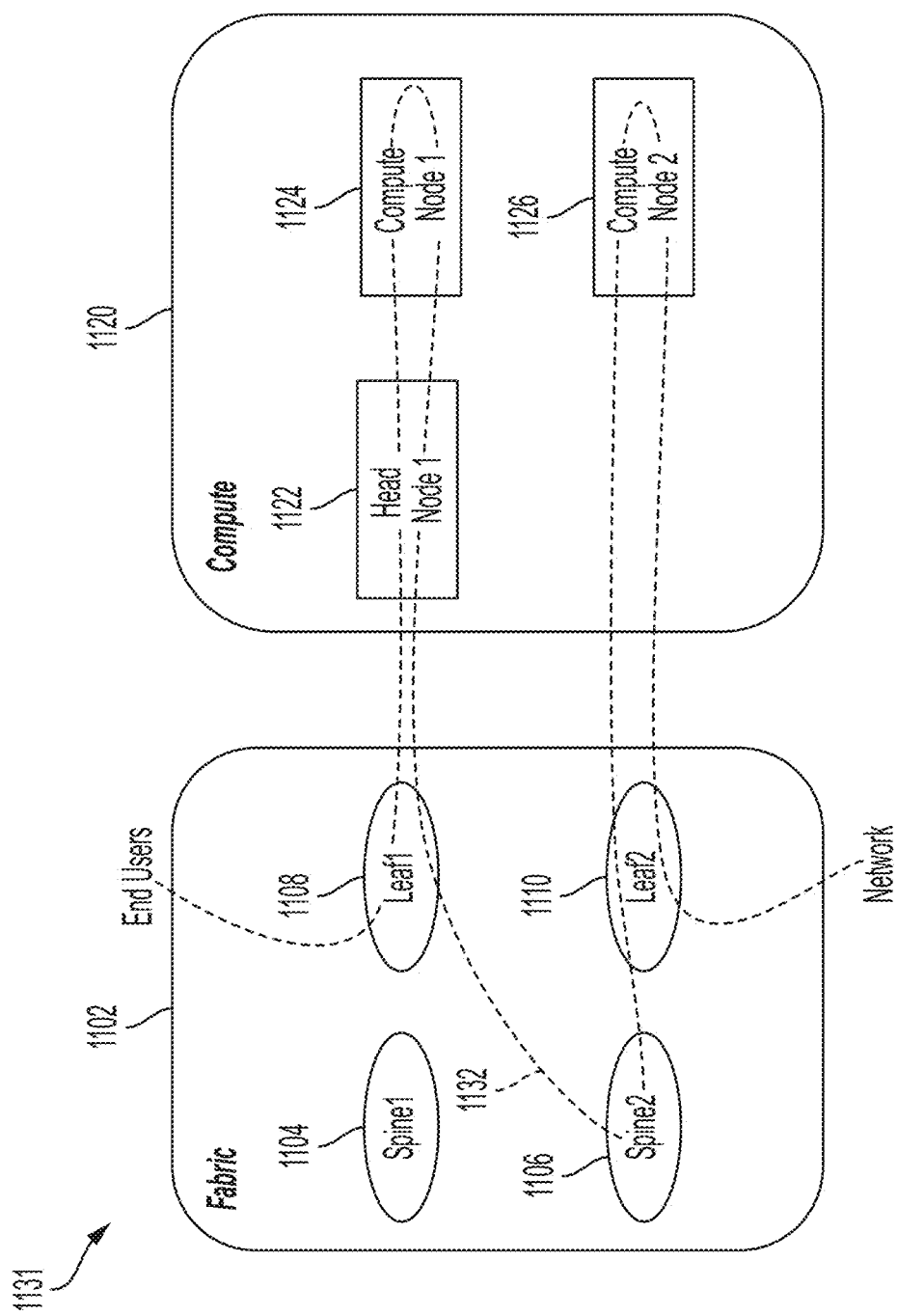
FIG. 11B depicts a diagram of other example connections and data paths associated with and/or used by at least portions of the disclosed systems and model(s) in connection with the exemplary network architecture, in accordance with example embodiments of the disclosure.

FIG. 11B depicts a diagram of another example connection and data paths associated with the model(s) of the network architecture, in accordance with example embodiments of the disclosure. In particular, diagram 1131 shows similar elements as diagram 1100, but shows a different path 1132 for end-user traffic to traverse from the access devices to the metro network. In some embodiments, the disclosed systems are able to model various paths between the nodes and fabric to capture different data planes for data transmission on different portions of the network architecture.

Figure 12:
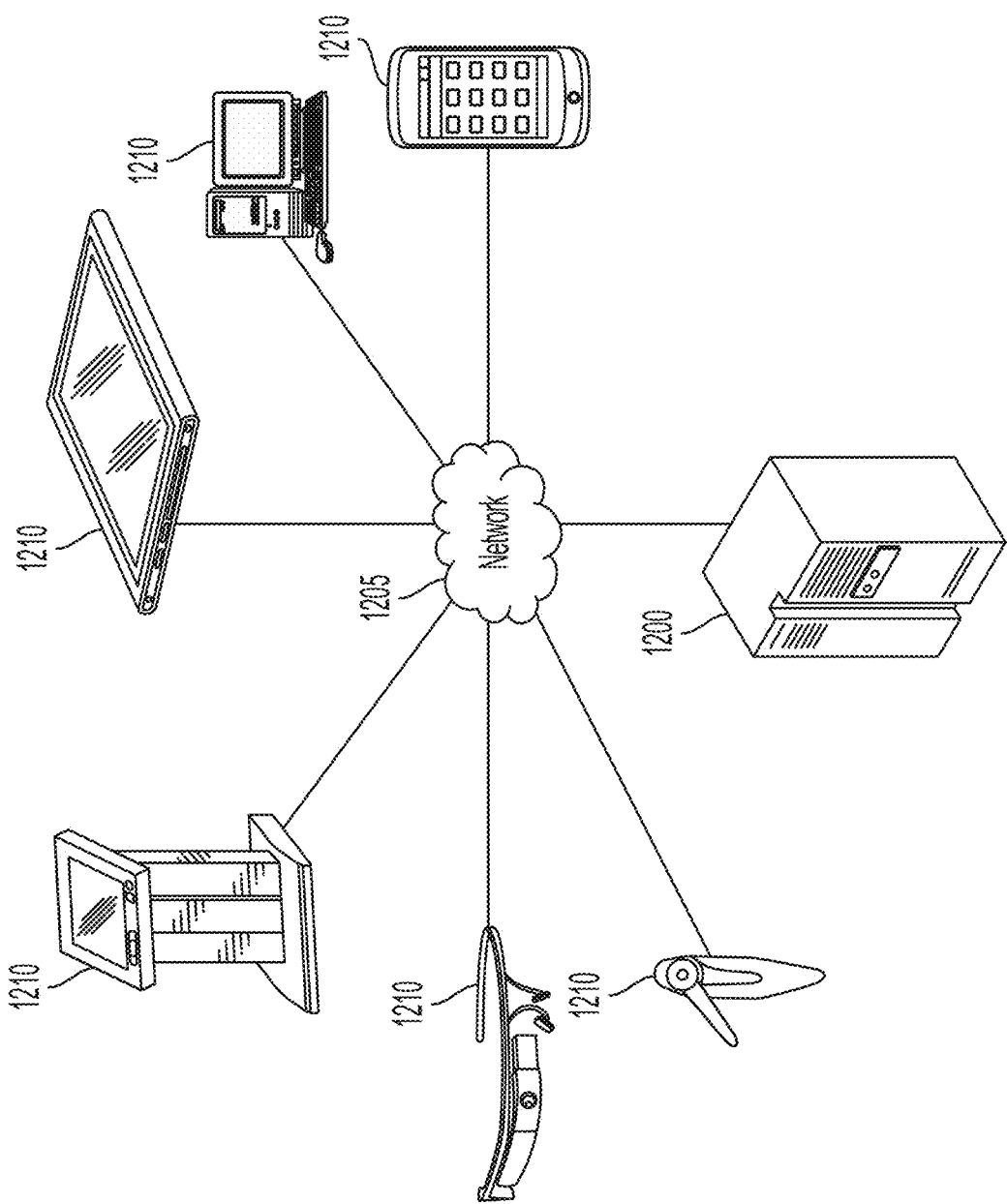
FIG. 12 shows an example schematic diagram of a system illustrating various devices that can be used in connection with various embodiments of the present disclosure.

FIG. 12 shows an example schematic diagram of a system that can be used to practice embodiments of the present disclosure. As shown in FIG. 12, this particular embodiment may include one or more management computing entities 1200, one or more networks 1205, and one or more user devices 1210. Each of these components, entities, devices, systems, and similar words used herein interchangeably may be in direct or indirect communication with, for example, one another over the same or different wired or wireless networks (e.g., network 102 shown and described in connection with FIG. 1 including, but not limited to, edge data centers and/or core data centers). Additionally, while FIG. 12 illustrates the various system entities as separate, stand-alone entities, the various embodiments are not limited to this particular architecture. Further, the management computing entities 1200 can include the modelling and/or machine learning components described herein. As noted, the communications can be performed using the any suitable protocols (e.g., a 5G network protocol), described further herein.

Figures 13, 14:
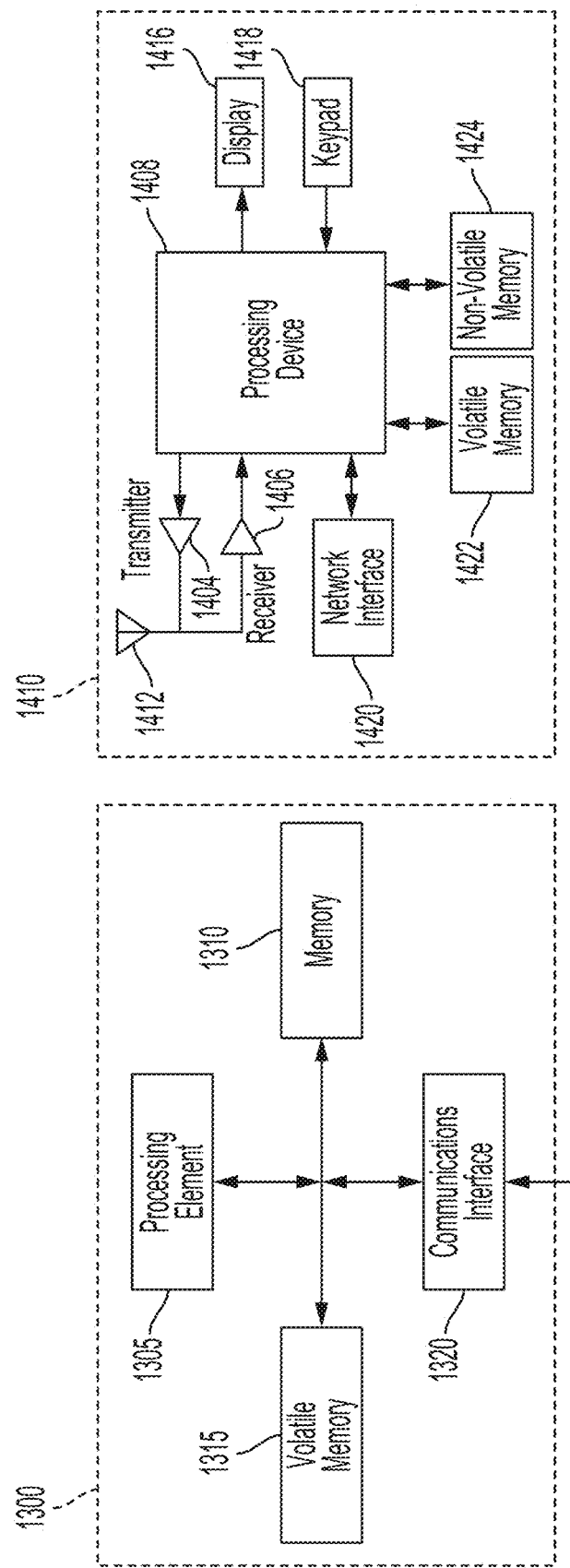
FIG. 13 shows an example schematic diagram of certain aspects of a management computing entity that can be used in connection with various embodiments of the present disclosure, in accordance with example embodiments of the disclosure.
FIG. 14 shows an example schematic diagram of an example device (e.g., user device such as a mobile device) that can be used in connection with various embodiments of the present disclosure, in accordance with example embodiments of the disclosure.

FIG. 13 shows an example schematic diagram of a management computing entity, in accordance with example embodiments of the disclosure. Further, the management computing entity 1300 may include a content component, a processing component, and a transmitting component (not shown). In particular, the content component may serve to determine signals indicative of data (e.g., video, audio, text, data, combinations thereof, and/or the like) to be transmitted over the network architecture described herein. In another embodiment, the determination of the signal for transmission may be, for example, based on a user input to the device, a predetermined schedule of data transmissions on the network, changes in network conditions, and the like. In one embodiment, the signal may include that data may be encapsulated in a data frame (e.g., a 5G data frame) that is configured to be sent from a device to one or more devices on the network.

In another embodiment, the processing element 1305 may serve to determine various parameters associated data transmitted over the network (e.g., network 1205). For example, the processing element 1305 may serve to run a model on the network data, run a machine learning technique on the network data, determine distributions of workloads to be processed by various portions of the network architecture, combinations thereof, and/or the like.

In one embodiment, a transmitting component (not shown) may serve to transmit the signal from one device to another device on the network. For example, the transmitting component may serve to prepare a transmitter (e.g., transmitter 1404 of FIG. 14, below) to transmit the signal over the network. For example, the transmitting component may queue data in one or more buffers, may ascertain that the transmitting device and associated transmitters are functional and have adequate power to transmit the signal over the network, may adjust one or more parameters (e.g., modulation type, signal amplification, signal power level, noise rejection, combinations thereof, and/or the like) associated with the transmission of the data.

In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dangles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 1200 may also include one or more communications interfaces 1320 for communicating with various computing entities, such as by communicating data, content, information, and/or similar terms used herein interchangeably that can be transmitted, received, operated on, processed, displayed, stored, and/or the like. For instance, the management computing entity 1200 may communicate with user devices 1210 and/or a variety of other computing entities.

As shown in FIG. 13, in one embodiment, the management computing entity 1200 may include or be in communication with one or more processing elements 1305 (also referred to as processors, processing circuitry, and/or similar terms used herein interchangeably) that communicate with other elements within the management computing entity 1200 via a bus, for example. As will be understood, the processing element 1305 may be embodied in a number of different ways. For example, the processing element 1305 may be embodied as one or more complex programmable logic devices (CPLDs), microprocessors, multi-core processors, coprocessing entities, application-specific instruction-set processors (ASIPs), microcontrollers, and/or controllers. Further, the processing element 1305 may be embodied as one or more other processing devices or circuitry. The term circuitry may refer to an entirely hardware embodiment or a combination of hardware and computer program products. Thus, the processing element 1305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 1305 may be configured for a particular use or configured to execute instructions stored in volatile or non-volatile media or otherwise accessible to the processing element 1305. As such, whether configured by hardware or computer program products, or by a combination thereof, the processing element 1305 may be capable of performing steps or operations according to embodiments of the present disclosure when configured accordingly.

In one embodiment, the management computing entity 1200 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 1310, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program components, scripts, source code, object code, byte code, compiled code, interpreted code, machine code, executable instructions, and/or the like. The term database, database instance, database management system, and/or similar terms used herein interchangeably may refer to collection of records or data that is stored in a computer-readable storage medium using one or more database models, such as a hierarchical database model, network model, relational model, entity relationship model, object model, document model, semantic model, graph model, and/or the like.

In one embodiment, the management computing entity 1200 may further include or be in communication with volatile media (also referred to as volatile storage, memory, memory storage, memory circuitry and/or similar terms used herein interchangeably). In one embodiment, the volatile storage or memory may also include one or more volatile storage or memory media 1315, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program components, scripts, source code, object code, byte code, compiled code, interpreted code, machine code, executable instructions, and/or the like being executed by, for example, the processing element 1305. Thus, the databases, database instances, database management systems, data, applications, programs, program components, scripts, source code, object code, byte code, compiled code, interpreted code, machine code, executable instructions, and/or the like may be used to control certain aspects of the operation of the management computing entity 1200 with the assistance of the processing element 1305 and operating system.

As indicated, in one embodiment, the management computing entity 1200 may also include one or more communications interfaces 1320 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 1200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, ZigBee, Bluetooth protocols, wireless universal serial bus (USB) protocols, and/or any other wireless protocol.

Although not shown, the management computing entity 1200 may include or be in communication with one or more input elements, such as a keyboard input, a mouse input, a touch screen/display input, motion input, movement input, audio input, pointing device input, joystick input, keypad input, and/or the like. The management computing entity 1200 may also include or be in communication with one or more output elements (not shown), such as audio output, video output, screen/display output, motion output, movement output, and/or the like.

As will be appreciated, one or more of the management computing entity's 1200 components may be located remotely from other management computing entity 1200 components, such as in a distributed system. Furthermore, one or more of the components may be combined and additional components performing functions described herein may be included in the management computing entity 1200. Thus, the management computing entity 1200 can be adapted to accommodate a variety of needs and circumstances. As will be recognized, these architectures and descriptions are provided for examples s only and are not limiting to the various embodiments.

A user may be an individual, a family, a company, an organization, an entity, a department within an organization, a representative of an organization and/or person, and/or the like. In one example, users may be employees, residents, customers, and/or the like. For instance, a user may operate a user device 1210 that includes one or more components that are functionally similar to those of the management computing entity 1200.

In various aspects, the processing component, the transmitting component, and/or the receiving component (not shown) may be configured to operate on one or more may include aspects of the functionality of the management computing entity 1200, as shown and described in connection with FIGS. 12 and 13 here. In particular, the processing component, the transmitting component, and/or the receiving component may be configured to be in communication with one or more processing elements 1305, memory 1310, volatile memory 1315, and may include a communication interface 1320 (e.g., to facilitate communication between devices).

FIG. 14 shows an example schematic diagram of a user device, in accordance with example embodiments of the disclosure. FIG. 14 provides an illustrative schematic representative of a user device 1210 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (for example Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User devices 1210 can be operated by various parties. As shown in FIG. 14, the user device 1210 can include an antenna 1412, a transmitter 1404 (for example radio), a receiver 1406 (for example radio), and a processing element 1408 (for example CPLDs, microprocessors, multi-core processors, coprocessing entities, ASIPs, microcontrollers, and/or controllers) that provides signals to and receives signals from the transmitter 1404 and receiver 1406, respectively.

The signals provided to and received from the transmitter 1404 and the receiver 1406, respectively, may include signaling information in accordance with air interface standards of applicable wireless systems. In this regard, the user device 1210 may be capable of operating with one or more air interface standards, communication protocols, modulation types, and access types. More particularly, the user device 1210 may operate in accordance with any of a number of wireless communication standards and protocols, such as those described above with regard to the management computing entity 1200. In a particular embodiment, the user device 1210 may operate in accordance with multiple wireless communication standards and protocols, such as the disclosed IoT DOCSIS protocol, UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC. Bluetooth, USB, and/or the like. Similarly, the user device 1210 may operate in accordance with multiple wired communication standards and protocols, such as those described above with regard to the management computing entity 1200 via a network interface 1420.

Via these communication standards and protocols, the user device 1210 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Component Dialer (SIM dialer). The user device 1210 can also download changes, add-ons, and updates, for instance, to its firmware, software (for example including executable instructions, applications, program components), and operating system.

According to one embodiment, the user device 1210 may include location determining aspects, devices, components, functionalities, and/or similar words used herein interchangeably. The location determining aspects may be used to inform the models used by the management computing entity and one or more of the models and/or machine learning techniques described herein. For example, the user device 1210 may include outdoor positioning aspects, such as a location component adapted to acquire, for example, latitude, longitude, altitude, geocode, course, direction, heading, speed, universal time (UTC), date, and/or various other information/data. In one embodiment, the location component can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's 1210 position in connection with a variety of other systems, including cellular towers, Wi-Fi access points, and/or the like. Similarly, the user device 1210 may include indoor positioning aspects, such as a location component adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 1210 may also comprise a user interface (that can include a display 1416 coupled to a processing element 1408) and/or a user input interface (coupled to a processing element 1408). For example, the user interface may be a user application, browser, user interface, and/or similar words used herein interchangeably executing on and/or accessible via the user device 1210 to interact with and/or cause display of information from the management computing entity 1200, as described herein. The user input interface can comprise any of a number of devices or interfaces allowing the user device 1210 to receive data, such as a keypad 1418 (hard or soft), a touch display, voice/speech or motion interfaces, or other input devices. In embodiments including a keypad 1418, the keypad 1418 can include (or cause display of) the conventional numeric (0-9 and related keys (#, *), and other keys used for operating the user device 1210 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 1210 can also include volatile storage or memory 1422 and/or non-volatile storage or memory 1424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program components, scripts, source code, object code, byte code, compiled code, interpreted code, machine code, executable instructions, and/or the like to implement the functions of the user device 1210. As indicated, this may include a user application that is resident on the entity or accessible through a browser or other user interface for communicating with the management computing entity 1200 and/or various other computing entities.

In another embodiment, the user device 1210 may include one or more components or functionality that are the same or similar to those of the management computing entity 1200, as described in greater detail above. As will be recognized, these architectures and descriptions are provided for example purposes only and are not limiting to the various embodiments.

Figure 15:
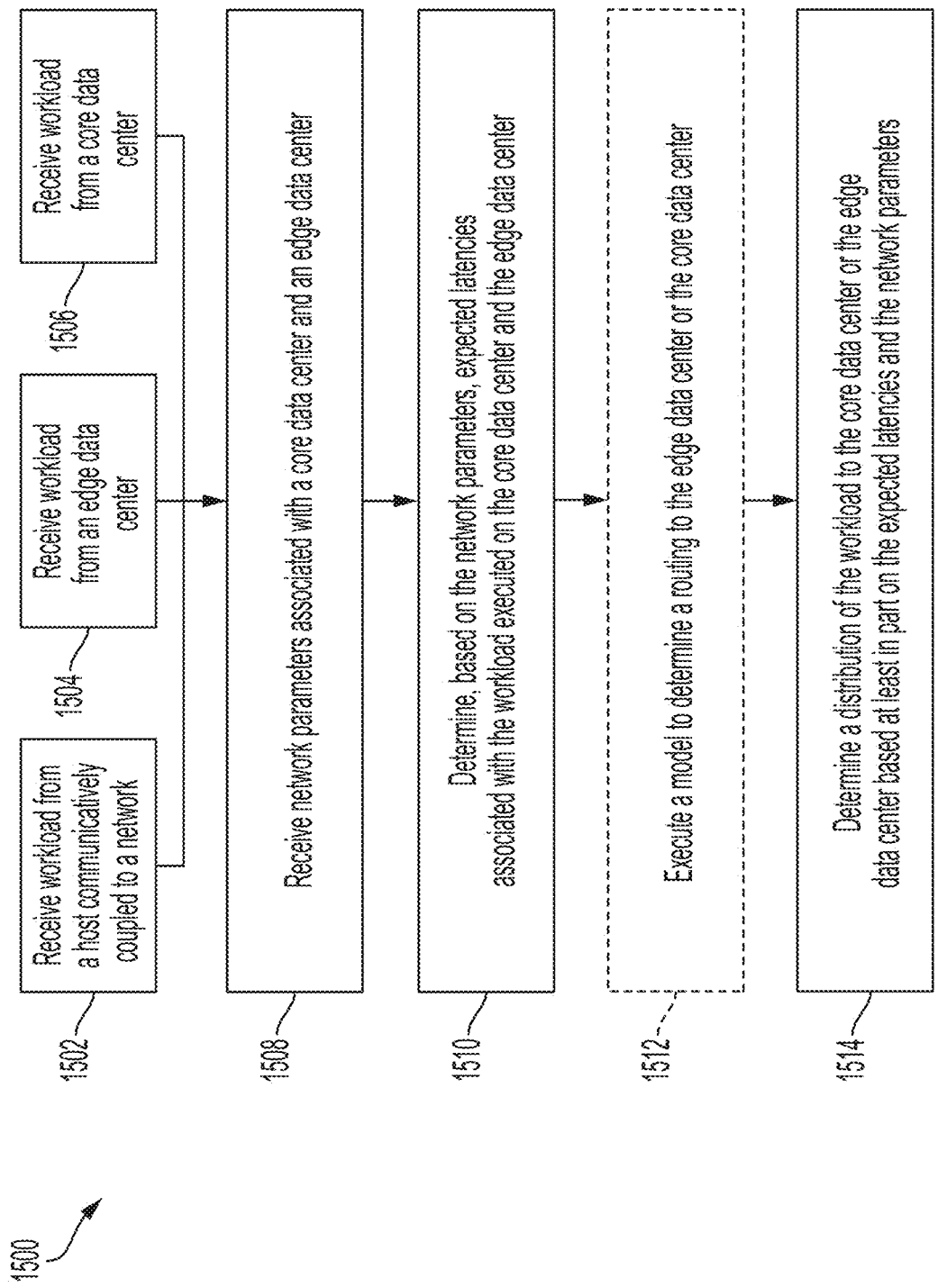
FIG. 15 is an illustration of an exemplary method of operating the disclosed systems to determine, for example, by a computing component of a management computing entity, a distribution of a workload over a network architecture, in accordance with example embodiments of the disclosure.

FIG. 15 is an illustration of an exemplary method 1500 of operating the disclosed systems to determine a distribution of a workload over a network architecture, in accordance with example embodiments of the disclosure. At block 1502, the disclosed systems can receive a workload from a host communicatively coupled to a network. In some embodiments, the host can include a host on the Internet. In some examples, the workload can originate from a device connected to the host, for example, a user device (e.g., a mobile phone) that requests a particular service (e.g., a video streaming request, a search request, combinations thereof, and/or the like). In some aspects, the reception of the workload from the host can be similar, hut not necessarily identical to, the process shown and described in connection with FIG. 1, above.

At block 1504, the disclosed systems can receive workload from an edge data center. Similar to block 1502, the workload can originate from a device connected to the edge data center, for example, a user device (e.g., a mobile phone) that requests a particular service (e.g., a video streaming request, a search request, combinations thereof, and/or the like). In some aspects, the reception of the workload from the host can be similar, but not necessarily identical to, the process shown and described in connection with FIG. 3, above.

At block 1506, the disclosed systems can receive workload from a core data center. Similar to blocks 1502 and 1504, the workload can originate from a device connected to the edge data center or core data center, for example, a user device (e.g., a mobile phone) that requests a particular service (e.g., a video streaming request, a search request, etc.). In some aspects, the reception of the workload from the host can be similar, but not necessarily identical to, the process shown and described in connection with FIG. 2, above.

In some examples, the disclosed systems can receive a portion of the workloads from a combination of any of the host, edge data center, and/or core data center, for example, in a disaggregated manner. For example, more than one device requesting the service can be connected in a peer-to-peer (P2P) connection and can originate a composite workload that can be received at different portions of the network architecture (e.g., the host, edge data center, and/or core data center). Further, the disclosed systems can aggregate the partial workload requests at the management computing entity (which itself can be executed partially or in full at any suitable location on the network architecture) for further processing as per the operations described below.

At block 1508, the disclosed systems can receive network parameters associated with a core data center and an edge data center. In particular, the disclosed systems can employ the management computing entity shown and described variously herein to monitor the network architecture to determine network parameters. In some embodiments, the disclosed systems may intercept or otherwise access raw data that is transmitted on various portions of the network architecture and determine, from the raw data, certain network parameters including, but not limited to, data rates, machine utilization ratios, and/or the like, for example, as further shown and described in connection with FIG. 7, above.

At block 1510, the disclosed systems can determine, based on the network parameters, expected latencies associated with the workload executed on the core data center and the edge data center. In particular, the disclosed systems can use a model as further shown and described in connection with FIGS. 7-9 to determine latencies associated with the workload. Non-limiting examples of the latencies can include the service time delay including the processing and communications delays shown and described in connection with FIG. 8, above. In some embodiments, the disclosed systems can determine the latencies that are mapped to a specific network architecture (e.g., a MEC architecture) implementing specific protocols (e.g., 5G network protocols).

At block 1512, the disclosed systems can optionally execute a model to determine a routing to the edge data center or the core data center. In particular, the disclosed systems can implement a machine learning technique to determine an optimal routing to the edge data center or the core data center. For example, the disclosed systems can implement a supervised machine learning technique as further shown and described in connection with FIG. 4 or an unsupervised machine learning technique, as further shown and described in connection with FIG. 5, to determine the expected distribution for routing a workload to the edge data center or the core data center. In other examples, the disclosed systems may implement predetermined rules (e.g., user-specified policies) for routing the workloads to the edge data center or the core data center as opposed to or in combination with the machine learning approach.

At block 1514, the disclosed systems can determine a distribution of the workload to the core data center or the edge data center based at least in part on the expected latencies and the network parameters. In particular, the disclosed systems can determine to transmit a first portion of the workload to a core data center and a second portion of the workload to the edge data center as characterized by the determined distribution. In some embodiments, the disclosed systems can determine the distribution that is likely to reduce the overall latency (e.g., the service delay) of the network architecture. In other aspects, the disclosed systems can further determine a distribution to reduce other factors associated with network architecture including, but not limited to, the bandwidth usage of the network, the power usage of the network or portions of the network, combinations thereof, and/or the like.

Figure 16A:
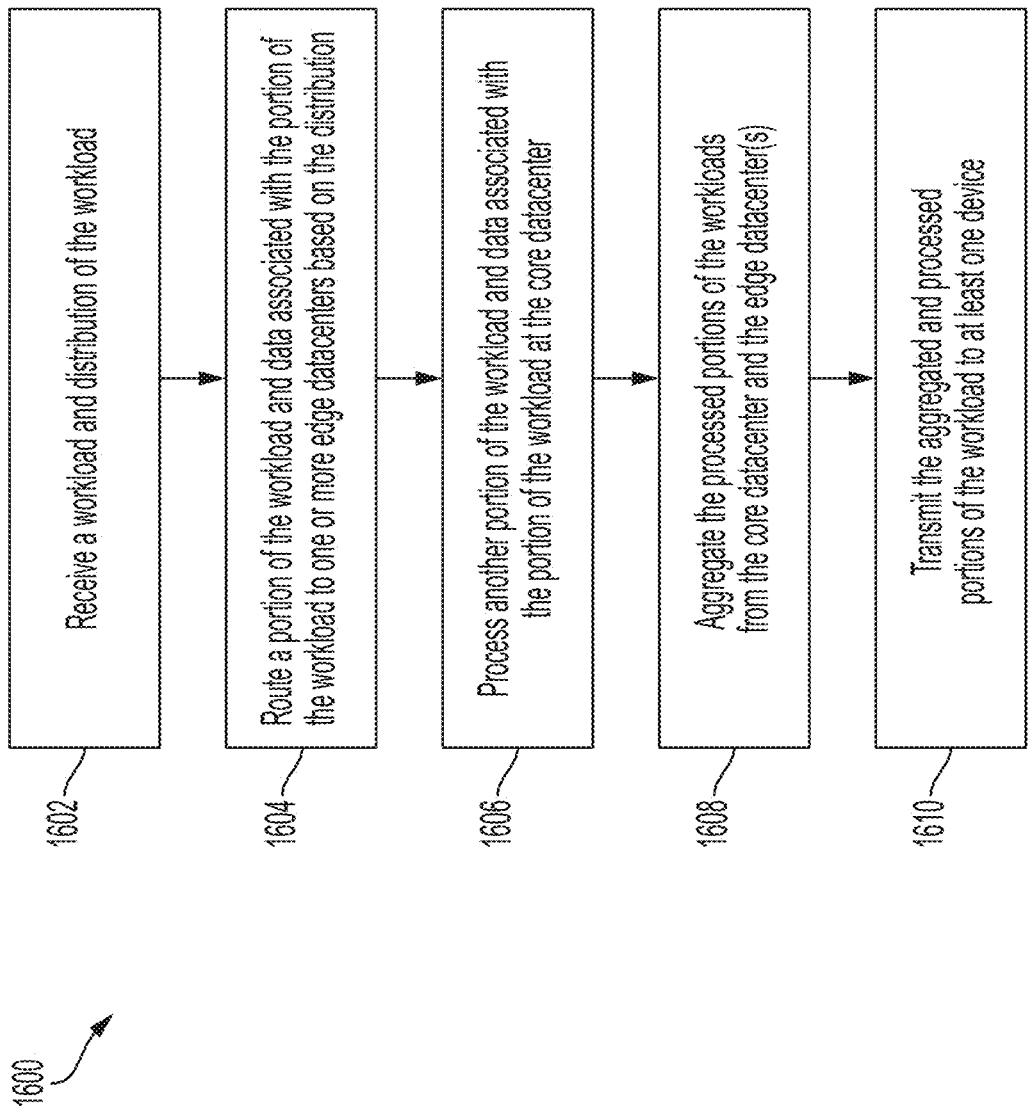
FIG. 16A is an illustration of an exemplary method of the disclosed systems for routing for example, by a routing component of a management computing entity, workloads to a core data center and one or more edge data centers over a network architecture, in accordance with example embodiments of the disclosure.

FIG. 16A is an illustration of an exemplary method 1600 of the disclosed systems to route the workload to a core data center and one or more edge data centers over a network architecture, in accordance with example embodiments of the disclosure. At block 1602, the disclosed systems can receive a workload and distribution of the workload. In some embodiments, a management computing entity residing on the core network can receive the workload and distribution.

As noted above, the workload can originate from a device connected to a host on the Internet or the core data center, for example, a user device (e.g., a mobile phone) that requests a particular service (e.g., a video streaming request, a search request, combinations thereof, and/or the like). Further, the distribution of the workload can be determined from the results of the modelling and/or machine learning technique described above in connection with FIG. 15 and described throughout the disclosure. In an example, the distribution can be determined based at least in part on the difference between a first programmatically expected latency associated with a core data center and a second programmatically expected latency associated with an edge data center exceeding a predetermined threshold.

At block 1604, the disclosed systems can route a portion of the workload and data associated with the portion of the workload to one or more edge data centers based on the distribution. In particular, the disclosed systems can break up discrete components of the workload into modular tasks, generate a series of packets associated with the discrete components of the workload, and transmit the packets over the network architecture to designated portions of the network (e.g., various edge data centers), as appropriate. Further, the disclosed systems can encapsulate the discrete components with any appropriate headers for transmission over any underlying network medium. For example, the disclosed systems can encapsulate the discrete components of the workload with a first metadata associated with first network protocol (e.g., 5G protocol) and can encapsulate the discrete components of the workload with a second metadata associated with a second network protocol (e.g., Ethernet protocol) for transmission to a first edge data center and a second edge data center, respectively.

At block 1606, the disclosed systems can process another portion of the workload and data associated with the portion of the workload at the core data center. In particular, the disclosed systems can retain a portion of the workload for processing at the core data center. For example, the portions processed at the core data center may require a relatively higher level of computational resources, which may be available at the core data center as opposed to the edge data center(s). In some embodiments, the disclosed systems can process the portion of the workload in accordance with any suitable service level agreement (SLA).

At block 1608, the disclosed systems can aggregate the processed portions of the workloads from the core data center and the edge data center(s). In some examples, the disclosed systems can include tags for the different portions of the workload, the tags reflecting the portion of the network (e.g., core or edge data center) that processed the respective portion of the workload. For example, the tags can be included in metadata associated with the portions of the workload (e.g., metadata associated with packets representing the portions of the workload). Accordingly, the disclosed systems can classify, filter, and/or aggregate the processed portions using the tags. In particular, the disclosed systems can receive a first completed workload associated with the first portion from the data center, and receive a second completed workload associated with the second portion from the edge data center, and classify, filter, or aggregate the first completed workload or the second completed workload using the first tag or second tag.

At block 1610, the disclosed systems can transmit the aggregated and processed portions of the workload to at least one device. In some embodiments, the disclosed systems can transmit the aggregated and processed portions to a device that is located at a similar or different portion of the network than the device that originated the workload request.

Figure 16B:
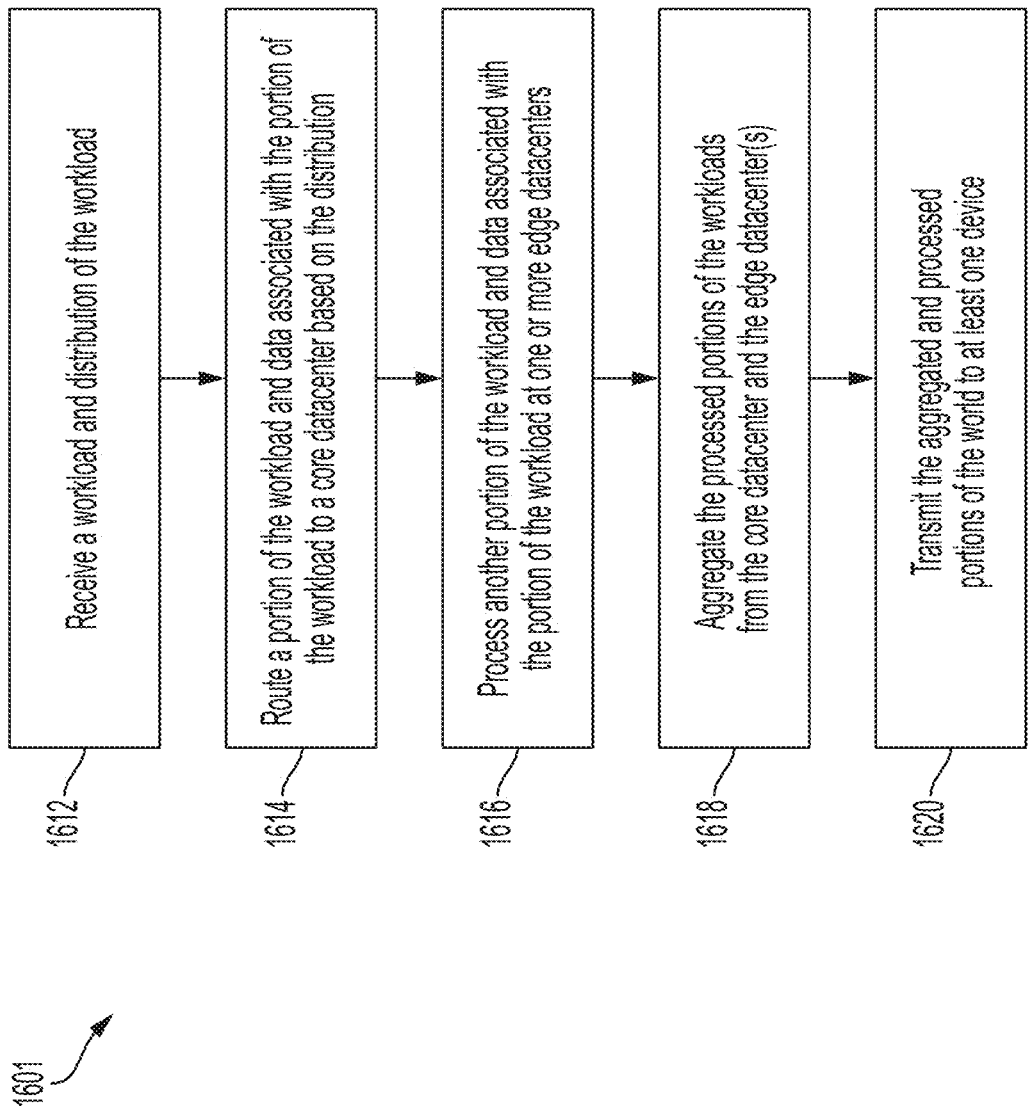
FIG. 16B is an illustration of another exemplary method of the disclosed systems to route, for example, by a routing component of a management computing entity, workloads to a core data center and one or more edge data centers over a network architecture, in accordance with example embodiments of the disclosure.

FIG. 16B is an illustration of another exemplary method 1601 of the disclosed system s to route the workload to a core data center and one or more edge data centers over a network architecture, in accordance with example embodiments of the disclosure. At block 1612, the disclosed systems can receive a workload and distribution of the workload. In some embodiments, a management computing entity residing on the edge network can receive the workload and distribution. As noted above, the workload can originate from a device connected to a host on the Internet or the core data center, for example, a user device (e.g., a mobile phone) that requests a particular service (e.g., a video streaming request, a search request, etc.). Further, the distribution of the workload can be determined from the results of the modelling and/or machine learning technique described above in connection with FIG. 15 and described throughout the disclosure.

At block 1614, the disclosed systems can route a portion of the workload and data associated with the portion of the workload to a core data center based on the distribution. As noted, the disclosed systems can break up discrete components of the workload into modular tasks, generate a series of packets associated with the discrete components of the workload, and transmit the packets over the network architecture to designated portions (e.g., core data centers), as appropriate. Further, the disclosed systems can encapsulate the discrete components with any appropriate headers for transmission over any underlying network medium. For example, the disclosed systems can encapsulate the discrete components of the workload with a first metadata associated with first network protocol (e.g., a 5G-based network protocol) and can encapsulate the discrete components of the workload with a second metadata associated with a second network protocol (e.g., an Ethernet-based network protocol) for transmission to a first core data center and a second core data center, respectively.

At block 1616, the disclosed systems can process another portion of the workload and data associated with the portion of the workload at one or more edge data centers. In particular, the disclosed systems can retain a portion of the workload for processing at the edge data center(s). For example, the portions processed at the edge data center(s) may require a relatively lower level of computational resources but reduced latencies, which may be available at an edge data center as opposed to the core data center. In some embodiments, the disclosed systems can process the portion of the workload in accordance with any suitable SLA.

At block 1618, the disclosed systems can aggregate the processed portions of the workloads from the core data center and the edge data center(s). In some examples, as noted, the disclosed systems can include tags for the different portions of the workload, the tags reflecting the portion of the network (e.g., core or edge data center) that processed the respective portion of the workload. For example, the tags can be included in metadata associated with the portions of the workload (e.g., metadata associated with packets representing the portions of the workload). Accordingly, the disclosed systems can classify, filter, and/or aggregate the processed portions using the tags.

At block 1620, the disclosed systems can transmit the aggregated and processed portions of the workload to at least one device. In some embodiments, the disclosed systems can transmit the aggregated and processed portions to a device that is located at a similar or different portion of the network than the device that originated the workload request.

Figure 17:
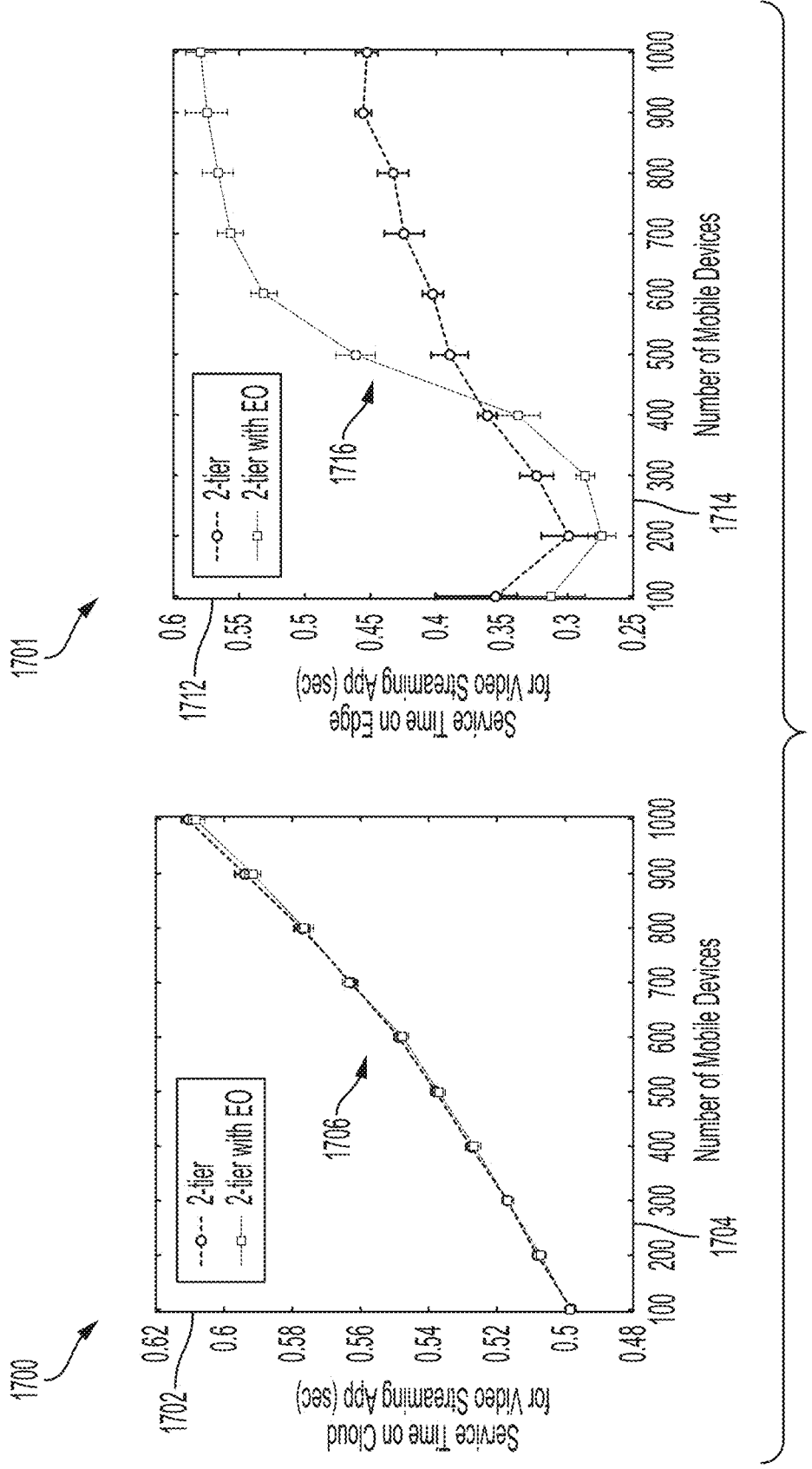
FIG. 17 shows plots of service time on the cloud for a video streaming application in units of seconds on the y-axis versus the number of mobile devices on the x-axis for a first number of user devices, in accordance with example embodiments of the disclosure.

Now turning to example results from test cases, FIGS. 17, 18, and 19 below show the service latency for an example video streaming application for different numbers of mobile devices when a task length is set at 200 MI, 3000 MI, and 45000 MI, respectively. In particular, FIG. 17 shows a first plot 1700 of a the service time on the cloud for a video streaming application in units of seconds on the y-axis versus the number of mobile devices on the x-axis, in accordance with example embodiments of the disclosure. In particular, the first plot 1700 depicts curves 1706 that depict the service time for both a 2-tier and a 2-tier with an EO, for a task size of 200 MI.

FIG. 17 further shows a second plot 1701 of a the service time on the edge for a video streaming application in units of seconds on the y-axis versus the number of mobile devices on the x-axis, in accordance with example embodiments of the disclosure. In particular, the second plot 1701 depicts curves 1716 that depict the service time for both a 2-tier and a 2-tier with an EO, for a task size of 200 MI. As can be shown from curves 1706 and 1716, the service time may generally increase for both cloud and edge computing processes as the number of devices increases; however, in an 2-tier MEC network architecture implementing an edge orchestrator the service time rise on the edge may be reduced in comparison with the service time on the cloud.

Figure 18:
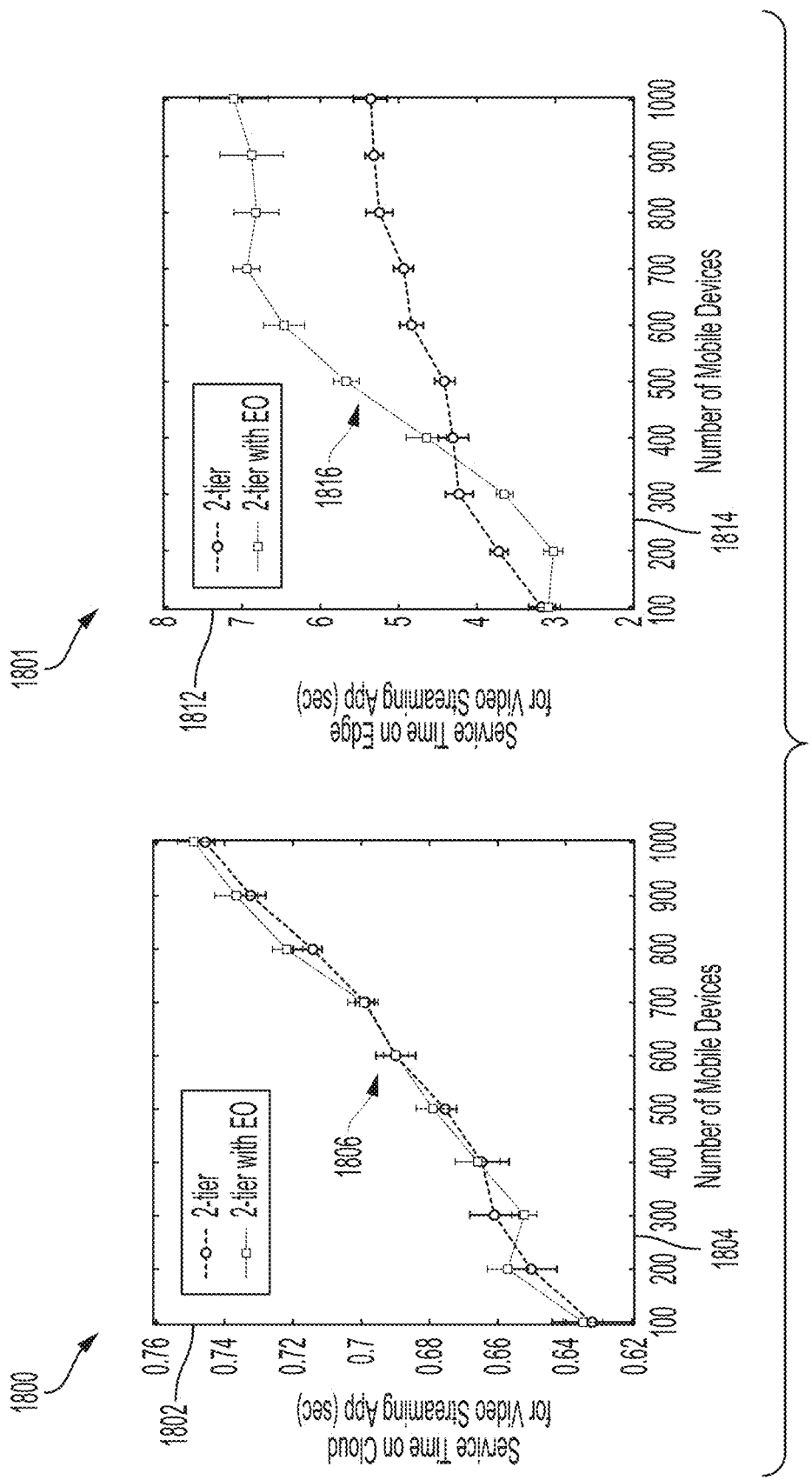
FIG. 18 shows additional plots of service time on the cloud for a video streaming application in units of seconds on the y-axis versus the number of mobile devices on the x-axis for a second number of user devices, in accordance with example embodiments of the disclosure.

FIG. 18 shows a first plot 1800 of a the service time on the cloud for a video streaming application in units of seconds on the y-axis versus the number of mobile devices on the x-axis, in accordance with example embodiments of the disclosure. In particular, the first plot 1800 depicts curves 1806 that depict the service time for both a 2-tier and a 2-tier with an EO, for a task size of 3000 MI.

FIG. 18 further shows a second plot 1801 of a the service time on the edge for a video streaming application in units of seconds on the y-axis versus the number of mobile devices on the x-axis, in accordance with example embodiments of the disclosure. In particular, the second plot 1801 depicts curves 1816 that depict the service time for both a 2-tier and a 2-tier with an EO, for a task size of 3000 MI. Again, as can be shown from curves 1806 and 1816, the service time may generally increase for both cloud and edge computing processes as the number of devices increases; however, in an 2-tier MEC network architecture implementing an edge orchestrator the service time rise on the edge may be reduced in comparison with the service time on the cloud.

Figure 19:
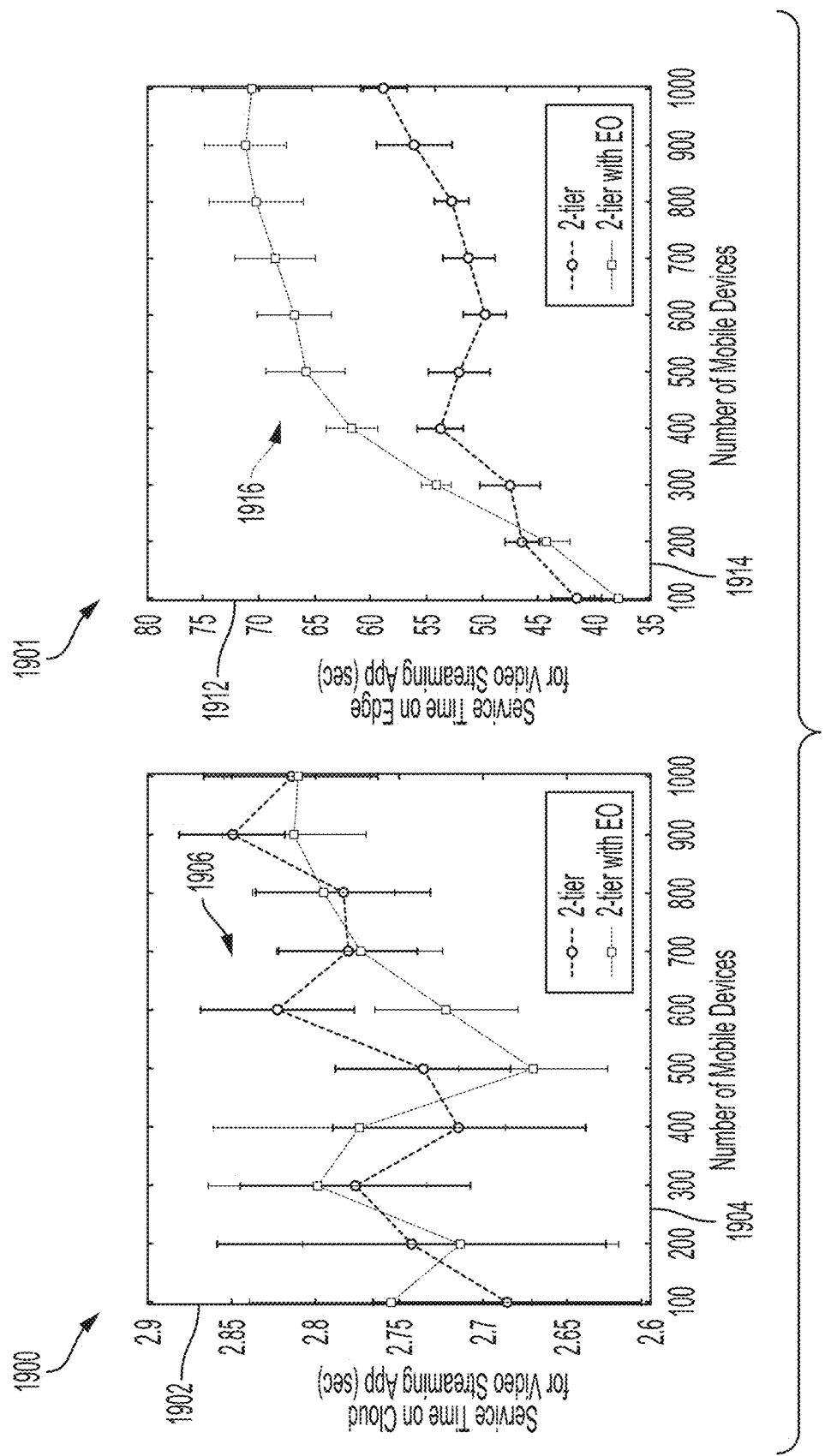
FIG. 19 shows additional plots of a service time on the cloud for a video streaming application in units of seconds on the y-axis versus the number of mobile devices on the x-axis for a third number of user devices, in accordance with example embodiments of the disclosure.

FIG. 19 shows a first plot 1900 of a the service time on the cloud for a video streaming application in units of seconds on the y-axis versus the number of mobile devices on the x-axis, in accordance with example embodiments of the disclosure. In particular, the first plot 1900 depicts curves 1906 that depict the service time for both a 2-tier and a 2-tier with an EU, for a task size of 45000 MI.

FIG. 19 further shows a second plot 1901 of a the service time on the edge for a video streaming application in units of seconds on the y-axis versus the number of mobile devices on the x-axis, in accordance with example embodiments of the disclosure. In particular, the second plot 1901 depicts curves 1916 that depict the service time for both a 2-tier and a 2-tier with an EO, for a task size of 45000 MI. As can be shown from curves 1906 and 1916, in a 2-tier MEC network architecture implementing an edge orchestrator the service time rise on the edge may be reduced in comparison with the service time on the cloud.

From the test results depicted in the plots of FIGS. 17, 18, and 19, it can be observed that during streaming, when the task size increases and additional streaming performance is necessary (such as when high definition video steaming is requested), the service time on cloud and edge can both increase together. Further, service time on the edge appears to not only be dominant, but increases faster compared with the latency increase on the cloud. Moreover, when the task size increases to 45000 MI, the edge becomes the bottleneck; the total service latency on the edge is at least about 20 times higher than the latency on cloud. In this case, the edge server may cause most of the delay. However, the amount of EUs appears to have a small effect on the service delay on the cloud, but still has a linear monotonically increasing effect on the latency on the edge. Furthermore, the results show that when the number of mobile devices is higher than 300, the architecture of 2-tier with EO appears to provide lower latency than the 2-tier architecture on the edge since the EO functions can distribute the tasks between servers in a balanced approach to optimize the request processing.

Figure 20:
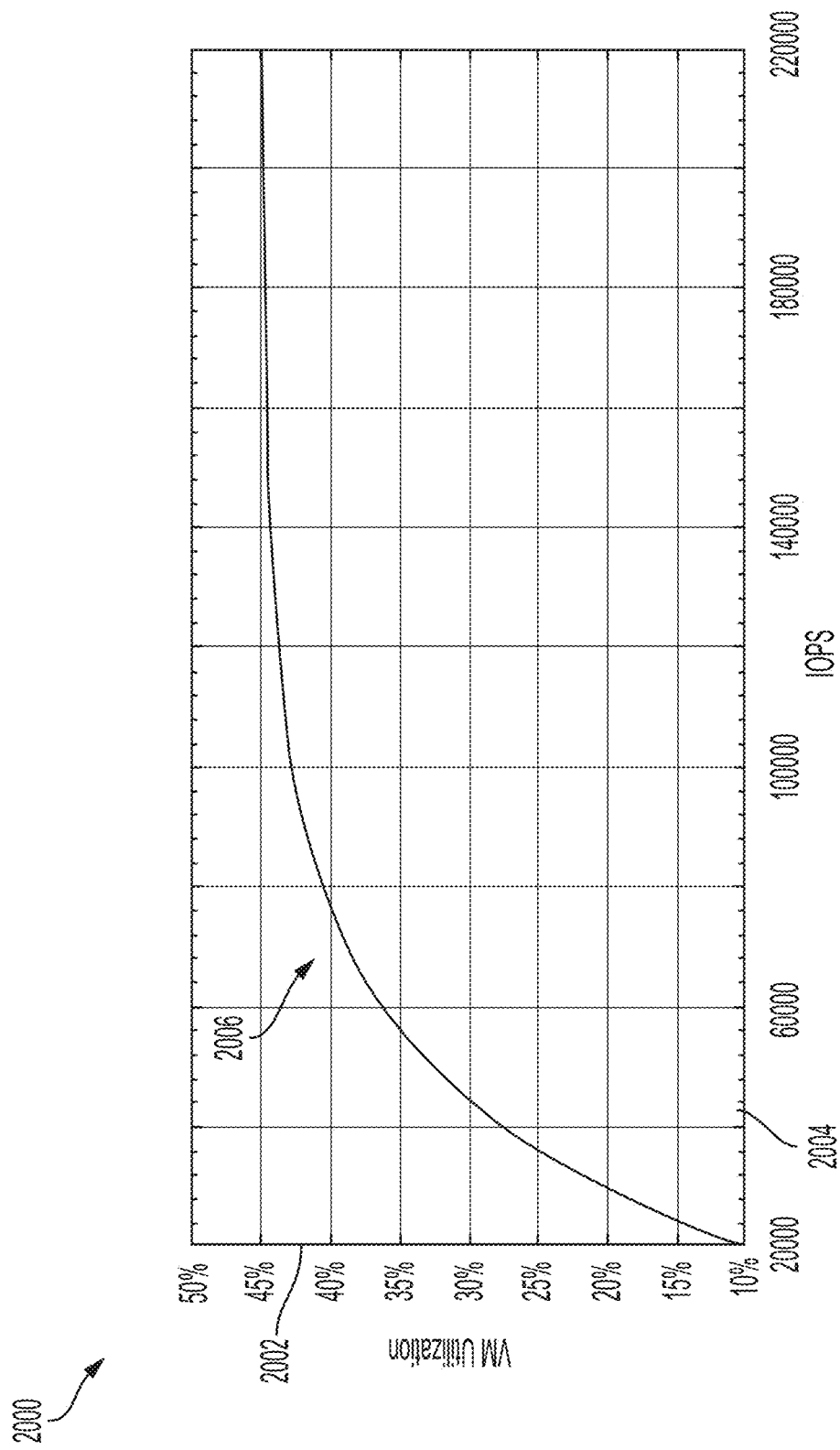
FIG. 20 shows a plot of a virtual machine (VM) utilization in units of percentage on the y-axis versus sequential read input/output operations per second (IOPS) on the x-axis, in accordance with example embodiments of the disclosure.

FIG. 20 further shows a plot 2000 of the virtual machine (VM) utilization in units of percentage on the y-axis versus IOPS on the x-axis, in accordance with example embodiments of the disclosure. As noted above, it can be noted from the results of the test depicted in FIGS. 17, 18, and 19, that for a relatively large task size in video streaming applications, the edge data center can become a bottleneck. In some examples, since communications over a LAN network can be decided by the 5G network, the edge data centers may encounter computational and storage resource congestions, for example, on virtual machines (VMs).

Accordingly, as shown in the plot of FIG. 20, the edge server storage performance effect on the service time can be modelled. In particular, the plot indicates that when the task size to be streamed is relatively large and the mobile device number is also relatively high, random access memory (RAM) and caching in a server (e.g., a server associated with the edge data center) can become saturated relatively quickly. Assuming the memory and caching are saturated when the task size is 3000 MI, the storage capacity and IOPS performance can be adjusted to model the relationship between the CPU utilization and disk IOPS for this specific application as shown in FIG. 20. In particular, the figure shows that given limited memory and caching, as the disk IOPS increase, CPU utilization in each VM on the edge server increase as well. However, this increase may not necessarily be linear since the CPU utilization does not exceed 100% per processor. In addition, drive activity is likely not the only task that causes the CPU to utilization to drop. Activities such as RAM access, communications with video/audio, and network activity can reduce CPU utilization also. In some embodiments, once the drive activity reaches a point where the delay that the drive causes is significantly smaller than the other delays to the CPU, the increasing rate of utilization may saturate.

Figure 21:
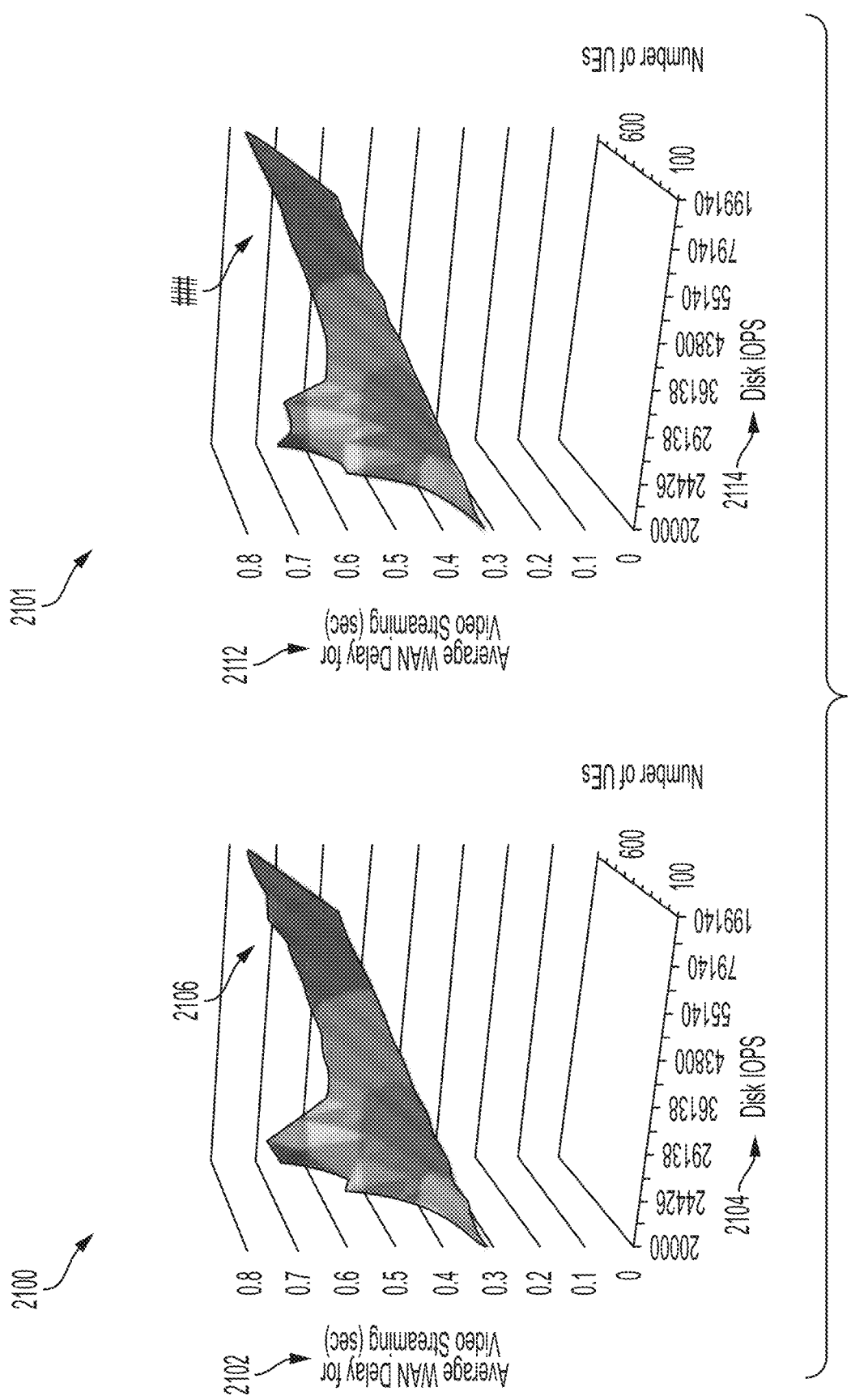
FIG. 21 shows three-dimensional plots of an average wide area network (WAN) delay for a video streaming application in units of seconds on the z-axis versus disk IOPs on the x-axis and the number of end user (EU) devices on the y-axis, in accordance with example embodiments of the disclosure.

FIG. 21 shows a first three-dimensional plot 2100 of an average WAN delay for a video streaming application in units of seconds on the z-axis versus the disk IOPs on the x-axis and the number of EU devices on the y-axis, in accordance with example embodiments of the disclosure. In particular, the first plot 2100 depicts curves 2106 that depict the average WAN delay for a 2-tier MEC architecture.

FIG. 21 further shows a second three-dimensional plot 2101 of an average WAN delay for a video streaming application in units of seconds on the z-axis versus the disk IOPs on the x-axis and the number of EU devices on the y-axis, in accordance with example embodiments of the disclosure. In particular, the second plot 2101 depicts curves 2116 that depict the average WAN delay for a 2-tier MFC architecture with an EO.

Figure 22:
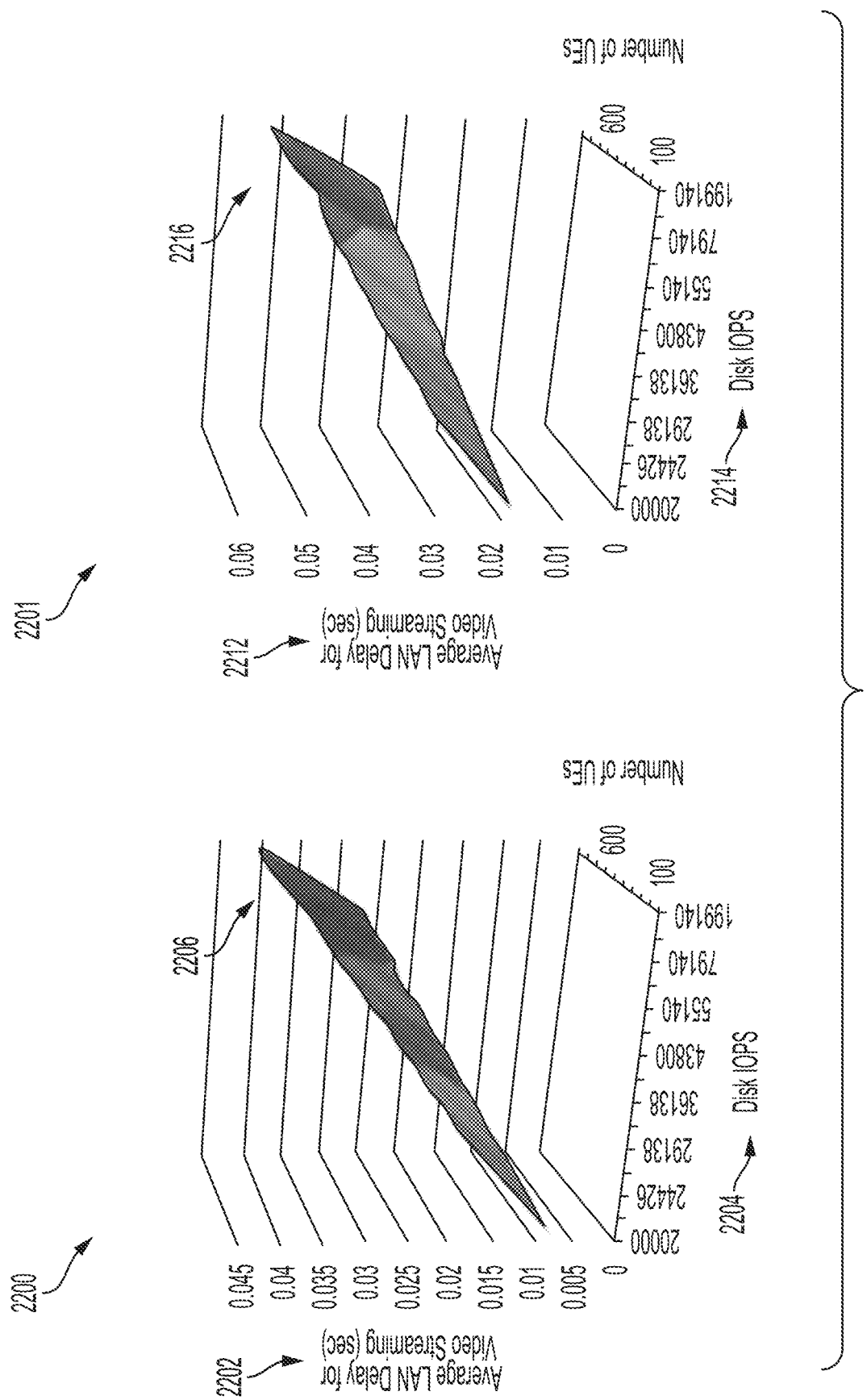
FIG. 22 shows three-dimensional plots of an average local area network (LAN) delay for a video streaming application in units of seconds on the z-axis versus disk IOPs on the x-axis and the number of EU devices on the y-axis, in accordance with example embodiments of the disclosure.

FIG. 22 shows a first three-dimensional plot 2200 of an average LAN delay for a video streaming application in units of seconds on the z-axis versus the disk IOPs on the x-axis and the number of EU devices on the y-axis, in accordance with example embodiments of the disclosure. In particular, the first plot 2200 depicts a curve 2206 that depict the average LAN delay for a 2-tier MEC architecture.

FIG. 22 further shows a second three-dimensional plot 2201 of an average LAN delay for a video streaming application in units of seconds on the z-axis versus the disk IOPs on the x-axis and the number of EU devices on the y-axis, in accordance with example embodiments of the disclosure, in particular, the second plot 2201 depicts a curve 2216 that depict the average LAN delay for a 2-tier MEC architecture with an EO.

Based on the storage performance models shown and described in connection with FIGS. 21 and 22 above, the effect of the number of the EUs and the edge server disk IOPS on the performance of WAN networking delay (see FIG. 21) and on LAN networking delay (see FIG. 22) can be demonstrated. In particular, the cases when the number of users increased from 100 to 1000, as well as the cases when the storage IOPS increases are modelled. As shown in FIG. 21 and FIG. 22, the disclosed systems can determine that the WAN latency is approximately 10 times of the LAN latency for both 2-tier architectures. Accordingly, the WAN delay may increase when the number of users increases. Further, when the EU amount is relatively low, the WAN latency may monotonically increase with higher disk IOPS. However, when the total EU is high, the WAN delay may decrease first and rise as disk IOPS increases. LAN latency may increase when the amount of mobile equipment increases and also when IOPS increases.

Figure 23:
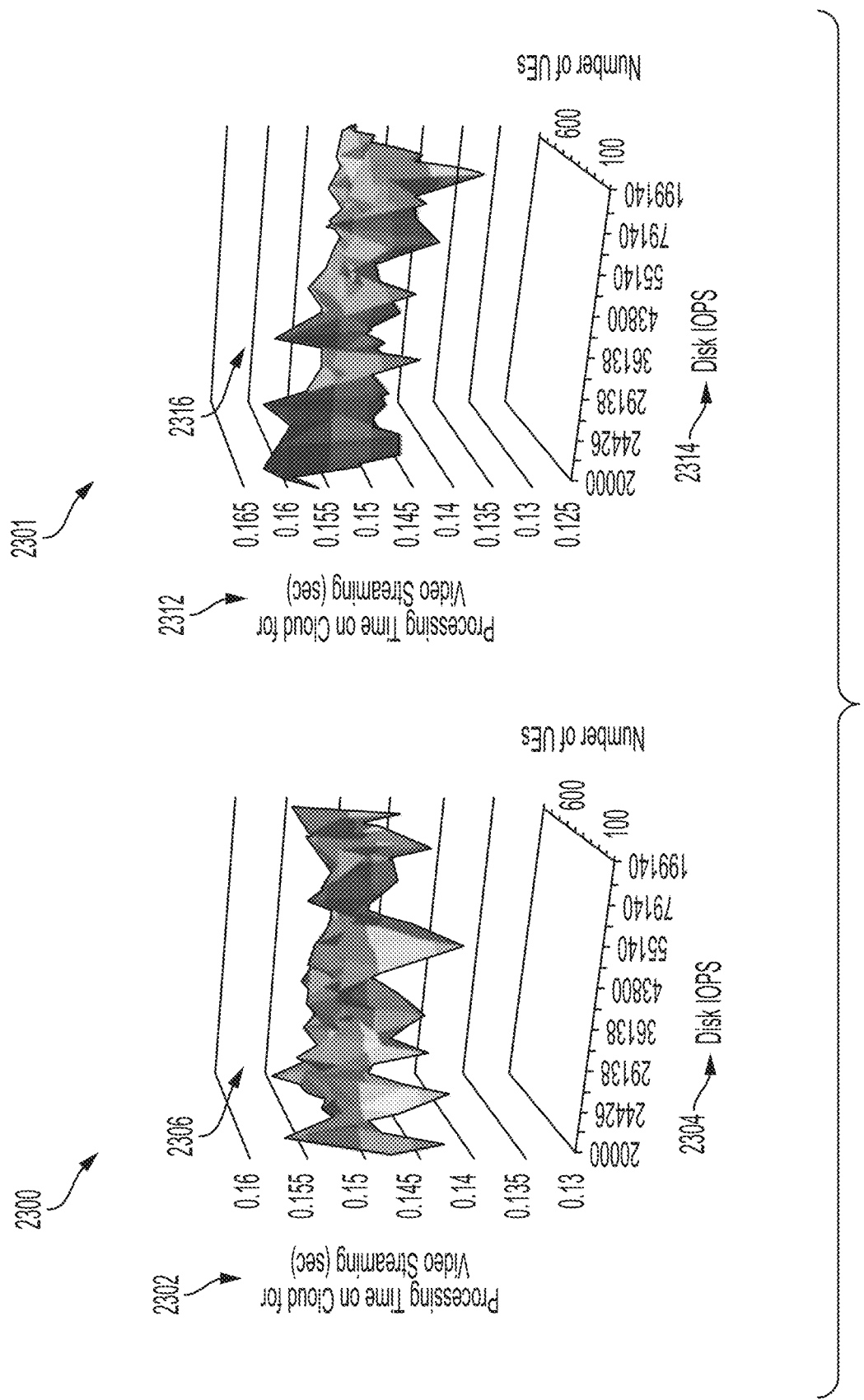
FIG. 23 shows three-dimensional plots of processing time on the cloud for a video streaming application in units of seconds on the z-axis versus the disk IOPs on the x-axis and the number of EU devices on the y-axis, in accordance with example embodiments of the disclosure.

FIG. 23 shows a first three-dimensional plot 2300 of processing time on the cloud for a video streaming application in units of seconds on the z-axis versus the disk IOPs on the x-axis and the number of EU devices on the y-axis, in accordance with example embodiments of the disclosure. In particular, the first plot 2300 depicts a curve 2306 that depict the processing time for a 2-tier MEC architecture.

FIG. 23 further shows a second three-dimensional plot 2301 of processing time on the cloud for a video streaming application in units of seconds on the z-axis versus the disk IOPs on the x-axis and the number of EU devices on the y-axis, in accordance with example embodiments of the disclosure. In particular, the second plot 2301 depicts a curve 2316 that depict the processing time for a 2-tier MEC architecture with an EQ.

Figure 24:
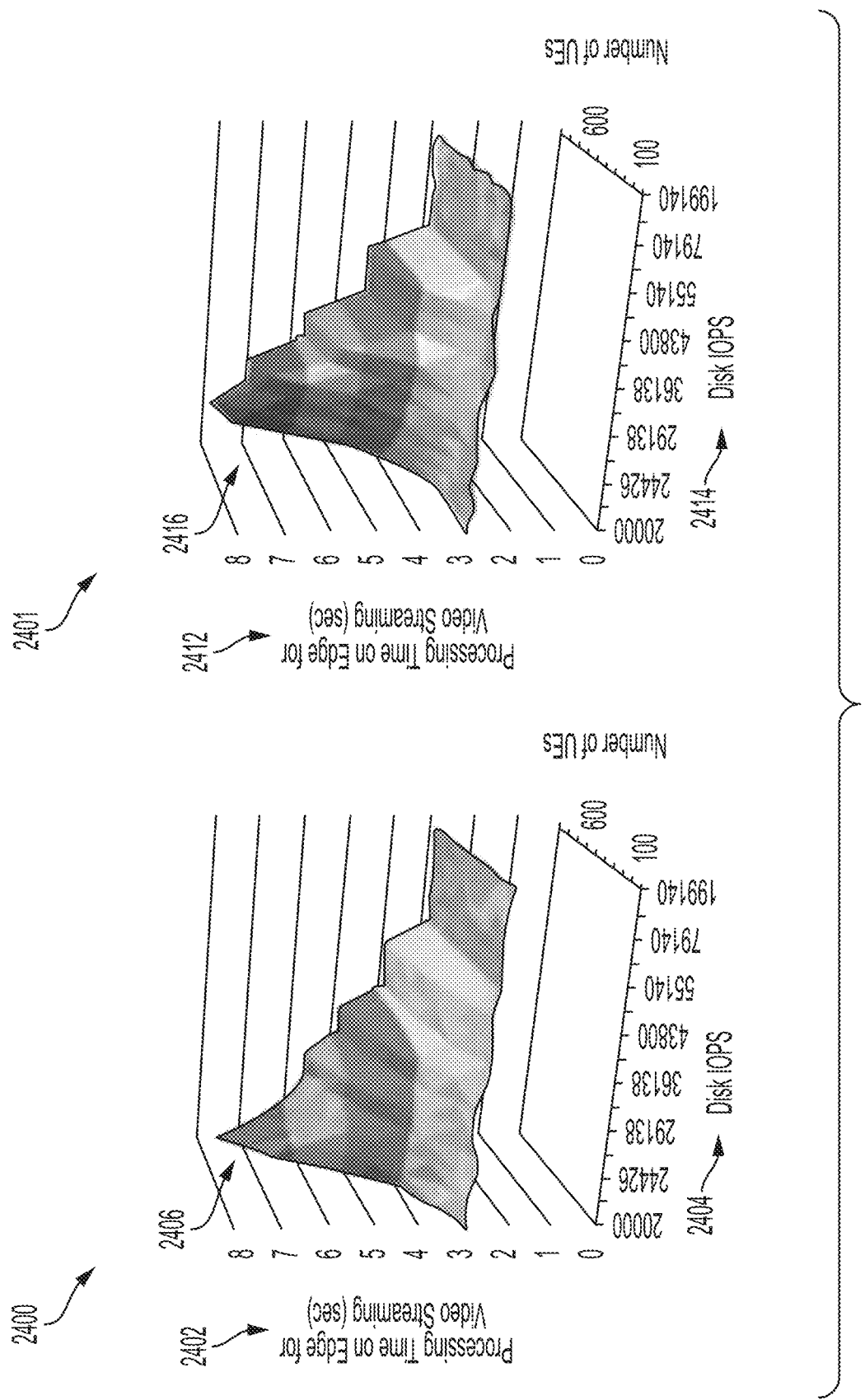
FIG. 24 shows three-dimensional plots of processing time on the edge (e.g., an edge data center) for a video streaming application in units of seconds on the z-axis versus the disk IOPs on the x-axis and the number of EU devices on the y-axis, in accordance with example embodiments of the disclosure.

FIG. 24 shows a first three-dimensional plot 2400 of processing time on the edge for a video streaming application in units of seconds on the z-axis versus the disk IOPs on the x-axis and the number of EU devices on the y-axis, in accordance with example embodiments of the disclosure. In particular, the first plot 2400 depicts a curve 2406 that depict the processing time for a 2-tier MEC architecture.

FIG. 24 further shows a second three-dimensional plot 2401 of processing time on the edge for a video streaming application in units of seconds on the z-axis versus the disk IOPs on the x-axis and the number of EU devices on the y-axis, in accordance with example embodiments of the disclosure. In particular, the second plot 2416 depicts the processing time for a 2-tier MEC architecture with an EO.

In particular, FIGS. 23 and 24 show the processing time on the cloud and the edge, separately. From FIG. 23, it can be demonstrated that the change of UEs and storage IOPS may have minimal impact on the processing time on the cloud (that is, core data center). However, the processing time on the edge data center may be greatly dominant on the whole computation latency, which can increase as the number of EUs increases and decrease as the IOPS becomes higher.

Figure 25:
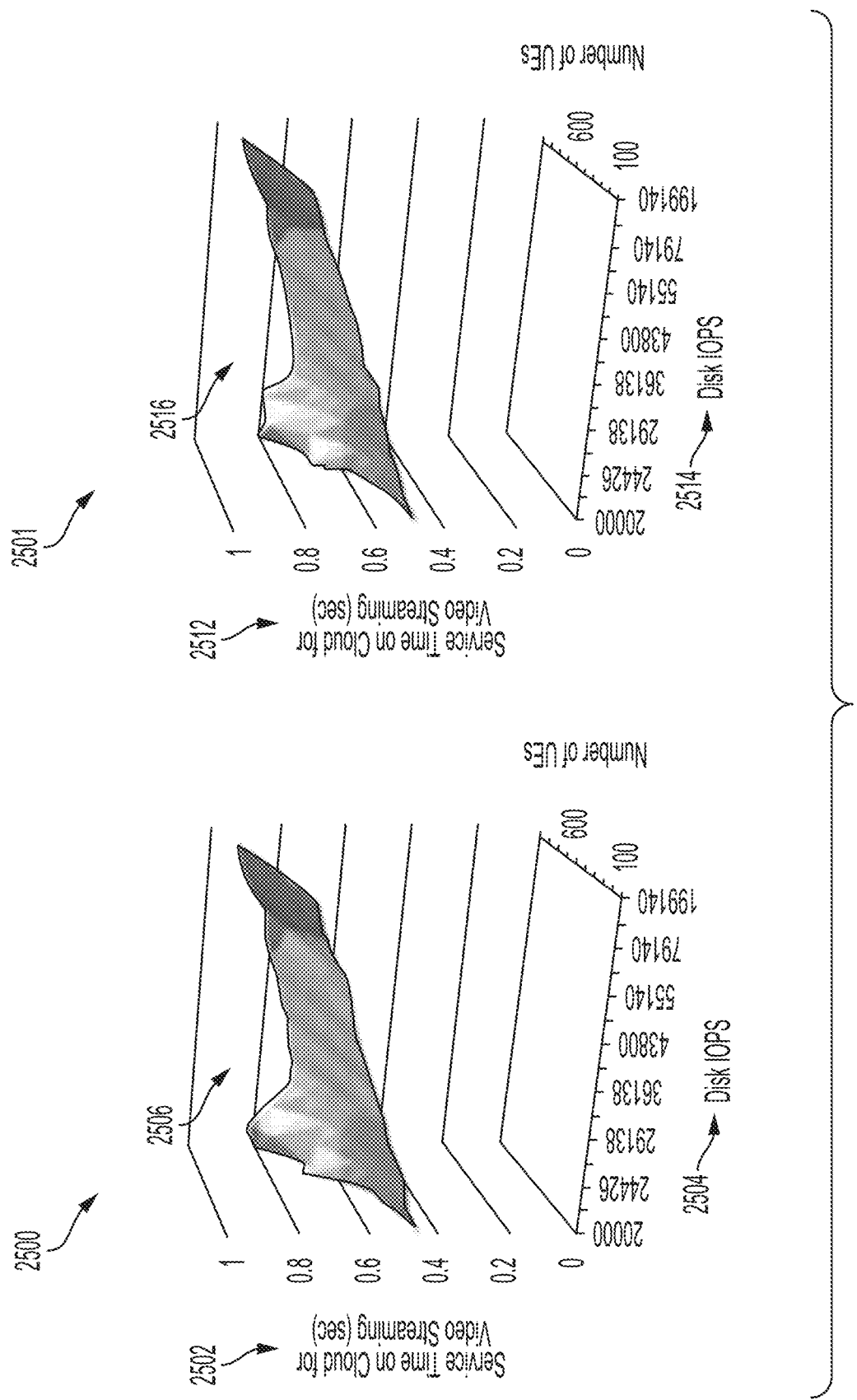
FIG. 25 shows three-dimensional plots of service time on the cloud for a video streaming application in units of seconds on the z-axis versus disk IOPs on the x-axis and the number of EU devices on the y-axis, in accordance with example embodiments of the disclosure.

FIG. 25 shows a first three-dimensional plot 2500 of service time on the cloud for a video streaming application in units of seconds on the z-axis versus the disk IOPs on the x-axis and the number of EU devices on the y-axis, in accordance with example embodiments of the disclosure. In particular, the first plot 2500 depicts a curve 2506 that depict the service time for a 2-tier MEC architecture.

FIG. 25 further shows a first three-dimensional plot 2501 of processing time on the edge for a video streaming application in units of seconds on the z-axis versus the disk IOPs on the x-axis and the number of EU devices on the y-axis, in accordance with example embodiments of the disclosure. In particular, the second plot 2501 depicts curves 2516 that depict the service time for a 2-tier MEC architecture with an EO.

Figure 26:
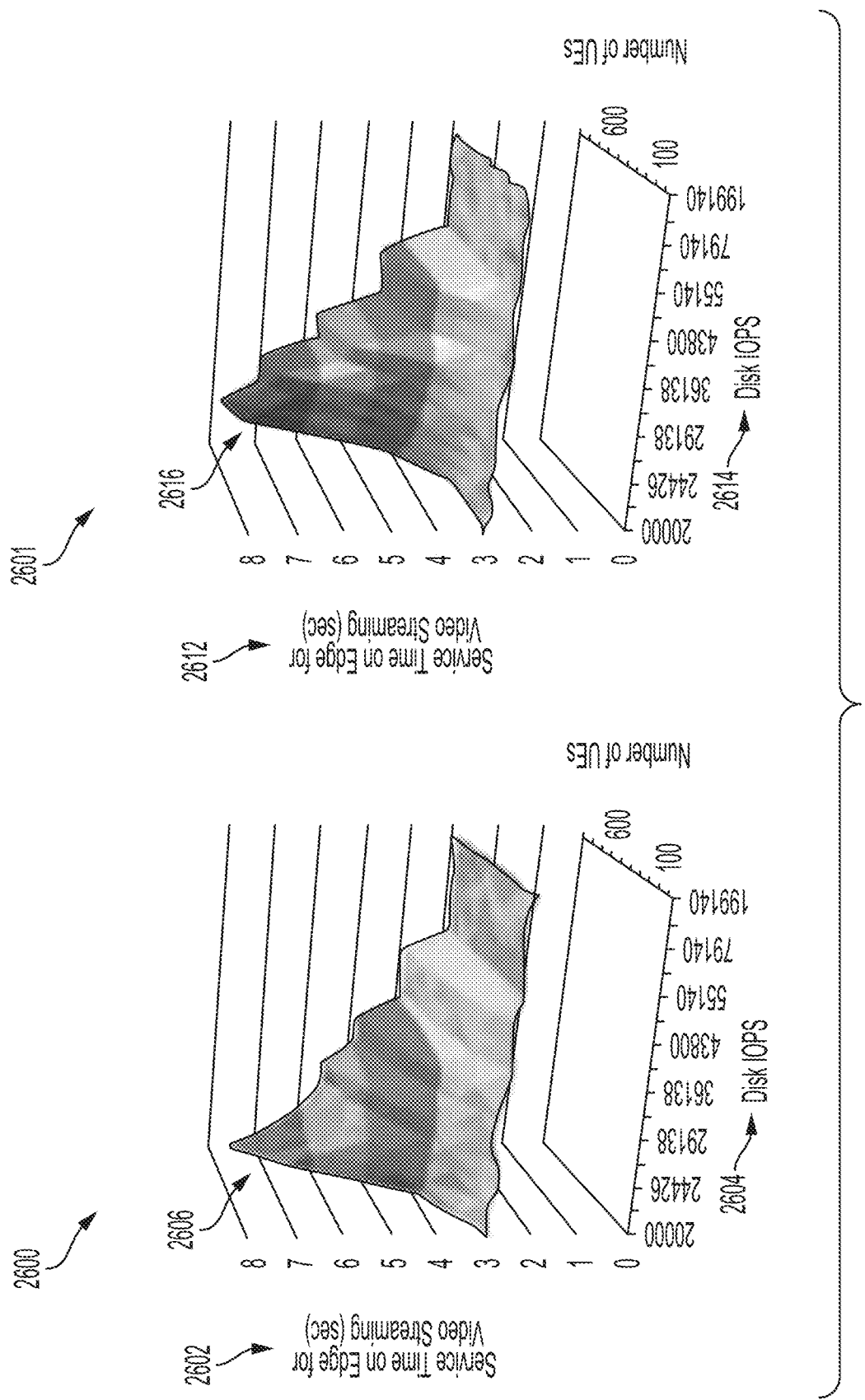
FIG. 26 shows three-dimensional plots of send service time on the edge for a video streaming application in units of seconds on the z-axis versus disk IOPs on the x-axis and the number of EU devices on the y-axis, in accordance with example embodiments of the disclosure.

FIG. 26 shows a first three-dimensional plot 2600 of service time on the edge for a video streaming application in units of seconds on the z-axis versus the disk IOPs on the x-axis and the number of EU devices on the y-axis, in accordance with example embodiments of the disclosure. In particular, the first plot 2600 depicts a curve 2606 that depict the service time for a 2-tier MEC architecture.

FIG. 26 further shows a first three-dimensional plot 2601 of service time on the edge for a video streaming application in units of seconds on the z-axis versus the disk IOPs on the x-axis and the number of EU devices on the y-axis, in accordance with example embodiments of the disclosure. In particular, the second plot 2601 depicts curves 2616 that depict the service time for a 2-tier MEC architecture with an EO.

In particular, FIG. 25 and FIG. 26 show plots of service time on the cloud and the edge, respectively. In some aspects, since the service time can include the total impact from communication and computation delays, FIG. 23 represents the delays shown in both FIG. 22 and FIG. 23, where the service time on the cloud (e.g., core data center) can mainly be caused by the WAN networking delay. Similarly, the service time on the edge represents the delays shown in both FIG. 22 and FIG. 24, and it is mainly caused by the processing time on the edge data center. The total service time is mainly spent on the edge data center, which shows that the latency on the edge can become the bottleneck.

In various aspects, the disclosed systems can serve to improve latencies on the MEC architecture to support 5G networks by optimizing edge computing platforms. The disclosed systems can model the storage performance effects on edge computing latency, where two-tier MEC structure and two-tier MEC with LB structures. Further, the effects on latency stemming from storage performance for an example use case of video streaming is variously described herein.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated tiles (for example tiles that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices, Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A device for network optimization, the device comprising:
    at least one memory device that stores computer-executable instructions; and
    at least one processor configured to access the memory device, wherein the processor is configured to execute the computer-executable instructions to:
        identify a workload including a request for service from a source;
        determine network parameters associated with a network architecture, the network architecture comprising a data center and an edge data center;
        determine, using the network parameters, a first programmatically expected latency associated with the data center and a second programmatically expected latency associated with the edge data center;
        determine, based at least in part on a difference between the first programmatically expected latency or the second programmatically expected latency, a distribution of the workload to be routed between the data center and the edge data center, wherein, the distribution is determined based at least in part on the difference exceeding a predetermined threshold;
        partition the-request into a first portion and a second portion;
        add a first header to the first portion and a second header to the second portion; and
        route the first portion of the request to the data center and the second portion of the request to the edge data center based on the distribution of the workload, wherein the processor is configured to route the first portion to the data center based on the first header, and route the second portion to the edge data center based on the second header, wherein at least one of the data center or the edge data center is configured to process at least one of the first portion or the second portion of the request and generate an output to provide the service requested by the source.

2. The device of claim 1, wherein the network parameters comprise at least one of a usage percentage, a core data center selection probability, a delay sensitivity value, a data upload amount, a data download amount, a processor usage requirement, or a virtual machine (VM) utilization.

3. The device of claim 1, wherein the computer-executable instructions to determine the distribution of the workload include computer-executable instruction for a machine learning technique, the machine learning technique comprising at least one of a supervised machine learning technique or an unsupervised machine learning technique, the machine learning technique further comprising at least one of a long short term memory (LSTM) neural network, a recurrent neural network, a time delay neural network, or a feed forward neural network.

4. The device of claim 1, wherein at least one of (1) a transmission rate associated with data traffic to and from the data center, (2) a transmission rate associated with data traffic to and from the edge data center, (3) a transmission rate associated with data traffic to and from a device associated with the edge data center, or (4) a transmission rate associated with data traffic to and from a device associated with the data center is throttled based on the difference.

5. The device of claim 1, wherein the processor is further configured to label at least a first portion of the workload with a first tag, the first tag for indicating that the first portion was processed by the data center, and the processor is configured to label at least a second portion of the workload with a second tag, the second tag for indicating that the second portion was processed by the edge data center.

6. The device of claim 5, wherein the processor is further configured to (1) receive a first completed workload associated with the first portion from the data center, and (2) receive a second completed workload associated with the second portion from the edge data center, and (3) classify, filter, or aggregate the first completed workload or the second completed workload using the first tag or second tag.

7. The device of claim 6, wherein the processor is configured to cause to transmit at least the first completed workload or the second completed workload to a second device on the network architecture.

8. The device of claim 1 wherein the processor is configured to execute the computer-executable instructions to:
receive a first result from the data center based on processing the first portion of the workload;
receive a second result from the edge data center based on processing the second portion of the workload; and
aggregate the first result and the second result.

9. Method for network optimization, the method comprising:
identifying a workload including a request for service from a source;
determining network parameters associated with a network architecture, the network architecture comprising a data center and an edge data center;
determining, using the network parameters, a first programmatically expected latency associated with the data center and a second programmatically expected latency associated with the edge data center;
determining, based at least in part on a difference between the first programmatically expected latency or the second programmatically expected latency, a distribution of the workload to be routed between the data center and the edge data center, wherein, the distribution is determined based at least in part on the difference exceeding a predetermined threshold;
partitioning the request into a first portion and a second portion;
adding a first header to the first portion and a second header to the second portion; and
routing the first portion of the request to the data center and the second portion of the request to the edge data center based on the distribution of the workload, wherein the routing of the first portion to the data center is based on the first header, and the routing of the second portion to the edge data center is based on the second header, wherein at least one of the data center or the edge data center is configured to process at least one of the first portion or the second portion of the request and generate an output to provide the service requested by the source.

10. The method of claim 9, wherein the network parameters comprise at least one of a usage percentage, a core data center selection probability, a delay sensitivity value, a data upload amount, a data download amount, a processor usage requirement, or a virtual machine (VM) utilization.

11. The method of claim 9, wherein the determining of the workload is performed using a machine learning technique, the machine learning technique comprising at least one of a supervised machine learning technique or an unsupervised machine learning technique, the machine learning technique further comprising at least one of an LSTM neural network, a recurrent neural network, a time delay neural network, or a feed forward neural network.

12. The method of claim 9, wherein the method further comprises throttling, based on the difference, at least one of (1) a transmission rate associated with data traffic to and from the data center, (2) a transmission rate associated with data traffic to and from the edge data center, (3) a transmission rate associated with data traffic to and from a device associated with the edge data center, or (4) a transmission rate associated with data traffic to and from a device associated with the data center.

13. The method of claim 9, wherein the method further comprises labeling at least a first portion of the workload with a first tag, the first tag for indicating that the first portion was processed by the data center, and labeling at least a second portion of the workload with a second tag, the second tag for indicating that the second portion was processed by the edge data center.

14. The method of claim 13, the method further comprising (1) receiving a first completed workload associated with the first portion from the data center, and (2) receiving a second completed workload associated with the second portion from the edge data center, and (3) classifying, filtering, or aggregating the first completed workload or the second completed workload using the first tag or second tag.

15. The method of claim 14, the method further comprising transmitting at least the first completed workload or the second completed workload to a second device on the network architecture.

16. A non-transitory computer-readable medium storing computer-executable instructions which, when executed by a processor, cause the processor to perform operations comprising:
identifying a workload including a request for service from a source;
determining network parameters associated with a network architecture, the network architecture comprising a data center and an edge data center;
determining, using the network parameters, a first programmatically expected latency associated with the data center and a second programmatically expected latency associated with the edge data center;
determining, based at least in part on a difference between the first programmatically expected latency or the second programmatically expected latency, a distribution of the workload to be routed between the data center and the edge data center, wherein, the distribution is determined based at least in part on the difference exceeding a predetermined threshold;

partitioning the request into a first portion and a second portion;

add a first header to the first portion and a second header to the second portion; and routing the first portion of the request to the data center and the second portion of the request to the edge data center based on the distribution of the workload, wherein the non-transitory computer-executable instructions further cause the processor to route the first portion to the data center based on the first header, and route the second portion to the edge data center based on the second header, wherein at least one of the data center or the edge data center is configured to process at least one of the first portion or the second portion of the request and generate an output to provide the service requested by the source.

17. The non-transitory computer-readable medium of claim 16, wherein the network parameters comprise at least one of a usage percentage, a core data center selection probability, a delay sensitivity value, a data upload amount, a data download amount, a processor usage requirement, or a virtual machine (VM) utilization.

18. The non-transitory computer-readable medium of claim 16, wherein the instructions that cause the processor to perform the determining of the distribution of the workload include instructions that cause the processor to perform a machine learning technique, the machine learning technique comprising at least one of a supervised machine learning technique or an unsupervised machine learning technique, the machine learning technique further comprising at least one of an LSTM neural network, a recurrent neural network, a time delay neural network, or a feed forward neural network.

19. The non-transitory computer-readable medium of claim 16, wherein at least one of (1) a transmission rate associated with data traffic to and from the data center, (2) a transmission rate associated with data traffic to and from the edge data center, (3) a transmission rate associated with data traffic to and from a device associated with the edge data center, or (4) a transmission rate associated with data traffic to and from a device associated with the data center is throttled based on the difference.

* * * * *